United States Patent [19]

Driels et al.

[11] Patent Number: 4,727,471
[45] Date of Patent: Feb. 23, 1988

[54] MINIATURE LIGHTWEIGHT DIGITAL CAMERA FOR ROBOTIC VISION SYSTEM APPLICATIONS

[75] Inventors: Morris R. Driels, W. Kingston; Edward A. Collins, Jr., Cumberland, both of R.I.

[73] Assignee: The Board of Governors for Higher Education, State of Rhode Island and Providence, Providence, R.I.

[21] Appl. No.: 770,710

[22] Filed: Aug. 29, 1985

[51] Int. Cl.⁴ .................. G06F 15/46; G06K 9/32
[52] U.S. Cl. .................. 364/167; 358/101; 364/513; 364/559; 382/46; 901/47
[58] Field of Search ............ 364/513, 559, 560, 514, 364/525; 356/2, 3, 376; 358/88, 101, 91, 92, 107; 382/48, 46, 27, 19, 8; 250/558; 364/167, 191–193; 901/46, 47

[56] References Cited

U.S. PATENT DOCUMENTS

| 4,146,924 | 3/1979 | Birk et al. | 382/48 |
|---|---|---|---|
| 4,412,293 | 10/1983 | Kelley et al. | 364/513 |
| 4,435,837 | 3/1984 | Abernathy | 364/559 |
| 4,437,114 | 3/1984 | LaRussa | 358/101 |
| 4,547,800 | 10/1985 | Masaki | 358/101 X |
| 4,593,406 | 6/1986 | Stone | 358/101 |
| 4,595,989 | 6/1986 | Yasukawa et al. | 364/513 |
| 4,611,292 | 9/1986 | Ninomiya et al. | 364/513 |

Primary Examiner—Joseph Ruggiero
Attorney, Agent, or Firm—Samuels, Gauthier, Stevens & Kehoe

[57] ABSTRACT

A robot arm with a vision system affixed thereto. A gripper acquires and object at an acquisition site and carries the object to a target site. During travel the position of the object is determined by the vision system viewing the object in two positions.

12 Claims, 21 Drawing Figures

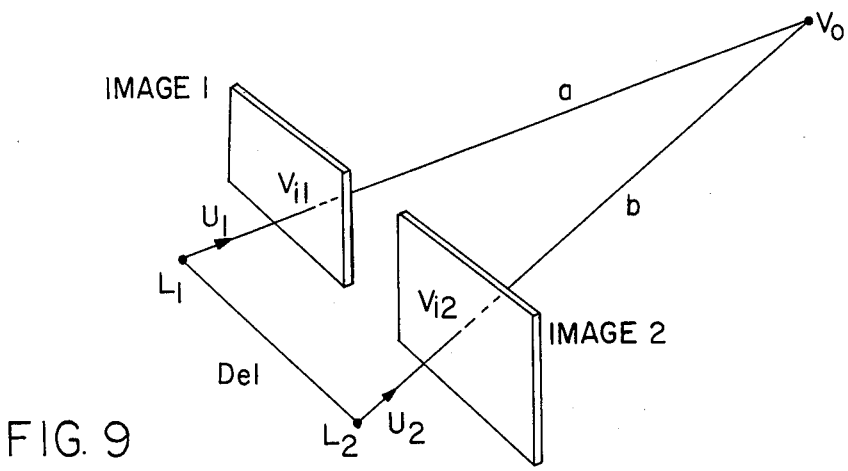
FIG. 9
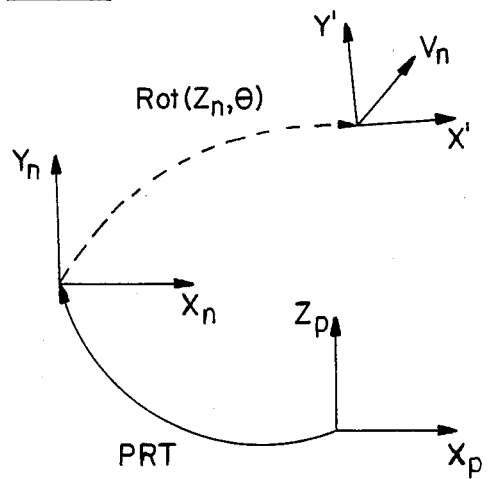
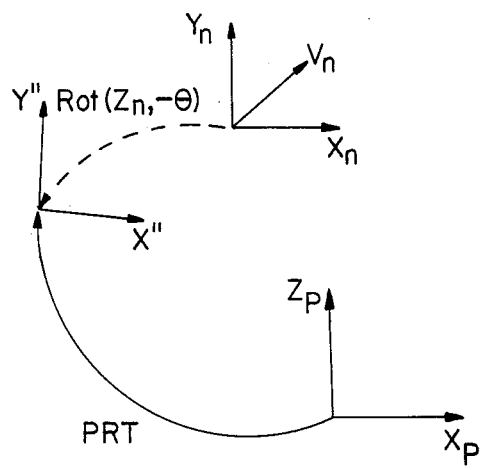
FIG. 10

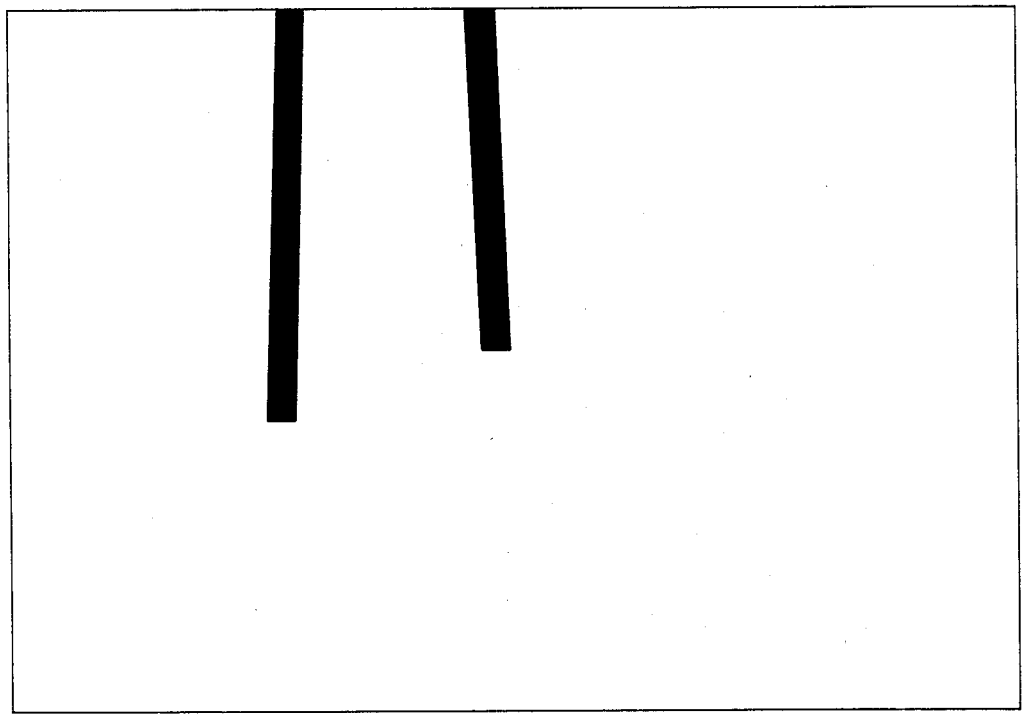
FIG. 12
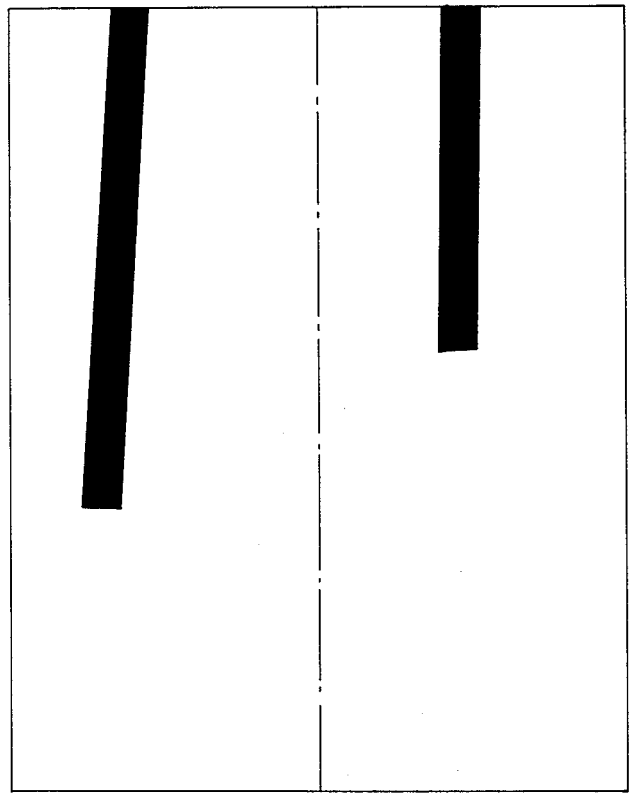
FIG. 13 BINARY IMAGE OF LEAD ENDS

MINIATURE LIGHTWEIGHT DIGITAL CAMERA FOR ROBOTIC VISION SYSTEM APPLICATIONS

MICROFICHE APPENDIX

Submitted herewith is an Appendix of one microfiche of fifty (50) frames.

BACKGROUND OF THE INVENTION

Many industries today are fast growing and have a very short product design life. A typical example of such an industry is the computer and electronics field.

Printed circuit boards, from which computers are built, are being frequently redesigned. Thus the manufacturing lines that build these boards need to be changed often. Factory automation is one answer to this need for flexibility in production.

Many mass produced products have been built using hard or fixed automation. However, the increase in design turnover requires a more flexible solution.

The problem of printed circuit board assembly has previously been investigated using flexible automation. A typical assembly application is the insertion of nonstandard long leaded components. This problem has been partially solved by various methods where blind insertion is applied using precise fixturing of the boards while the leads are inserted using mechanical guides. Miller, D. "Robotic Assembly in Electronic Manufacturing" Robotics Today, Vol. 5, No. 6, pp. 28–32, December 1983. Sanderson, A. C., Perry, G. "Sensor-Based Robotic Assembly Systems: Research and Applications in Electronic Manufacturing", Proceedings of IEEE, Vol. 71, No. 7, pp. 856–872, July 1983. Although this method is effective, the large size of the guiding mechanism required for the leads hinders the assembly of components which are very densely packed. In addition, if it is desired to insert components with varying numbers of leads, the end effector must be changed for each class of parts. Another solution uses two television cameras, one looking at each lead from below Asano, T. et al "Vision System of an Automatic Inserter for Printed Circuit Board Assembly" Proceedings 2nd International Conference on Robot Vision and Sensory Controls, pp. 63–73, November 1982. This method works well when inserting two leaded components but would not be suitable or practical for multi-leaded parts.

SUMMARY OF THE INVENTION

The invention is directed to the use of a robot manipulator adapted to recognize at least two distinct regions on an object and the subsequent placement of the object. A unitary vision system is used in combination with a robot arm to view the object held by a gripper. Broadly, the invention embodies a robotic manipulator where an object having at least two identifiable features is acquired by a gripper at an acquisition site. A vision system records images of the features in two different orientations and the location of at least one of the features in space is established. The location of the feature with respect to the robot coordinate system is determined and subsequently expressed as a tool transform. The object is placed at the target site. Preferably, the recording of the feature, the determination of the location of the feature with respect to the robot coordinate system and the expression of the location of the feature(s) as a tool transform is done while the object is being moved from the acquisition site to the target site. The movement of the object is continuous (although it may be continual if desired). This feature, of continuous movement, is believed, further distinguishes the invention from prior art systems such as exemplified in U.S. Pat. Nos. 4,305,130; 4,402,053 and 4,412,293 wherein once an object has been acquired it is moved to and held in a presentation pose. While in the presentation pose data is acquired and the object subsequently moved to a target site.

The invention will be described in reference to the acquisition of multi-leaded parts and their subsequent insertion into a circuit board. In an embodiment of the invention, a stereo triangulation procedure is used in combination with a procedure for determining the correspondence of image points in two images. In a preferred embodiment of the invention, a unique camera (vision system) is fixed to the arm of a robot manipulator and a transform is used to account for the relationship between the object and the camera during image acquisition and placement. Additional transforms, in a preferred embodiment, are used both to facilitate measurements on the image plane and to account for the discretization of the image plane.

In a particularly preferred embodiment an intermediate transform is used to insure better accuracy during camera calibration.

In the preferred embodiment of the invention using a single camera (vision system) fixed to the robot arm, the acquired object is rotated from a first position to a second position about a known axis, viewed by the single camera and first and second images are recorded.

The invention overcomes the prior art problems described above and provides a method and apparatus for three dimensional locating of at least two defined regions on an object using a single camera and the subsequent placement of that object in a desired location.

BRIEF DESCRIPTION OF THE DRAWINGS

FIG. 9 is an illustration of a dual camera stereo arrangement;

FIG. 10 is an illustration of stereo rangefinding using a single camera;

FIGS. 12 and 13 are binary images of lead ends;

DESCRIPTION OF THE PREFERRED EMBODIMENT(S)

The invention will be described with reference to an illustrative example where a robot manipulator with a camera mounted on its arm. The acquired object is a two-leaded electrical component. A computer vision algorithm determines the presence of the leads so that they may be properly inserted in a circuit board.

Figure 1:
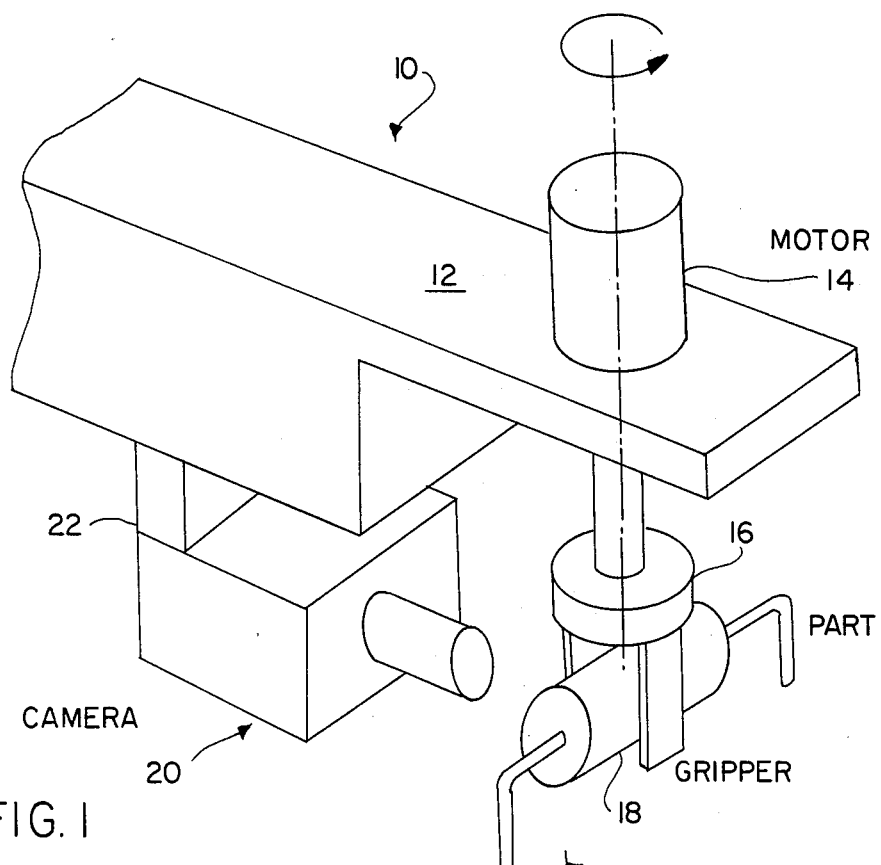
FIG. 1 is a perspective view of a gripper, robot arm and a two leaded component used to illustrate the invention.

In FIG. 1 the robot manipulator is shown as 10 and comprises a robot arm 12, a motor 14 to control the rotation of a gripper 16. A two-leaded object 18 is held by the gripper 16. A camera 20 is fixed to the arm 12 by a plate 22.

The Camera

The camera 20 is positioned such that the ends of the component leads 18 are visible when the component 18 is picked up by the manipulator 10. The lead end locations are determined using a stereoscopic rangefinding technique. The need for a second camera is eliminated by rotating the component with the robot manipulator. The camera takes a second image of the lead ends in a different pose.

The camera gives a binary output and is of the dynamic RAM variety.

In the following description the camera and computer vision algorithms are implemented on an Apple IIe microcomputer. Briefly the triangulation algorithm finds corresponding lead ends in two images of the component. This procedure yields the lead locations as tool transformations with respect to the robot manipulator. The robot manipulator used was a PUMA robot.

The camera model, calibration and stereoscopic triangulation procedures are based on the methods described in Duda, R. O., Hart, P. E. *Pattern Classification and Scene Analysis*, John Wiley and Sons, New York 1983 with the following modifications. An additional transformation is added to account for mounting the camera model on the robot manipulator. Two other transforms are appended to the model to make measurements on the image plane easier as well as to account for the discretization of the image plane. Another contribution is the acquisition of the second image for stereo analysis. Instead of using a second camera, a rotation of the object was performed about the last axis of the robot and a second image taken using the same camera.

The camera 20 attached to the robot arm is mobile and may be repositioned using the manipulator. The camera 20 can be moved close to the object being looked at thereby increasing the effective resolution. Loughlin, C. et al "Eye-in-Hand Vision Scores Over Fixed Camera" *Sensor Review*, Vol. 3, No. 1, pp 23–26, January 1983. That is, as the camera is moved closer to the scene, each pixel of the image represents a smaller area of the object. Therefore, knowing the tolerance needed for a particular application, this tolerance can be achieved by moving the camera closer to the object. This is assuming that the camera can be focused at the required distance.

Several robot mounted camera applications have been performed using standard size television cameras. Agin, J. et al "Servoing with Visual Feedback" *Machine Intelligence Research Application to Industrial Automation*, Sixth Report, Stanford Research Institute. Yakimovski, Y. et al "A System for Extracting 3-Dimensional Measurements From a Stereo Pair of TV Cameras" *Jet Propulsion Laboratory Technical Memorandum*, Vol. 33, No. 769, California Institute of Technology, May 1976, Hill, J., Park, W. T. "Real Time Control of Robot with a Mobile Camera" 9th International Symposium on Industrial Robots, pp. 233–246, March 1979. The cameras are too large to be used efficiently and, therefore, as part of the present invention, a camera was designed.

Figure 2:
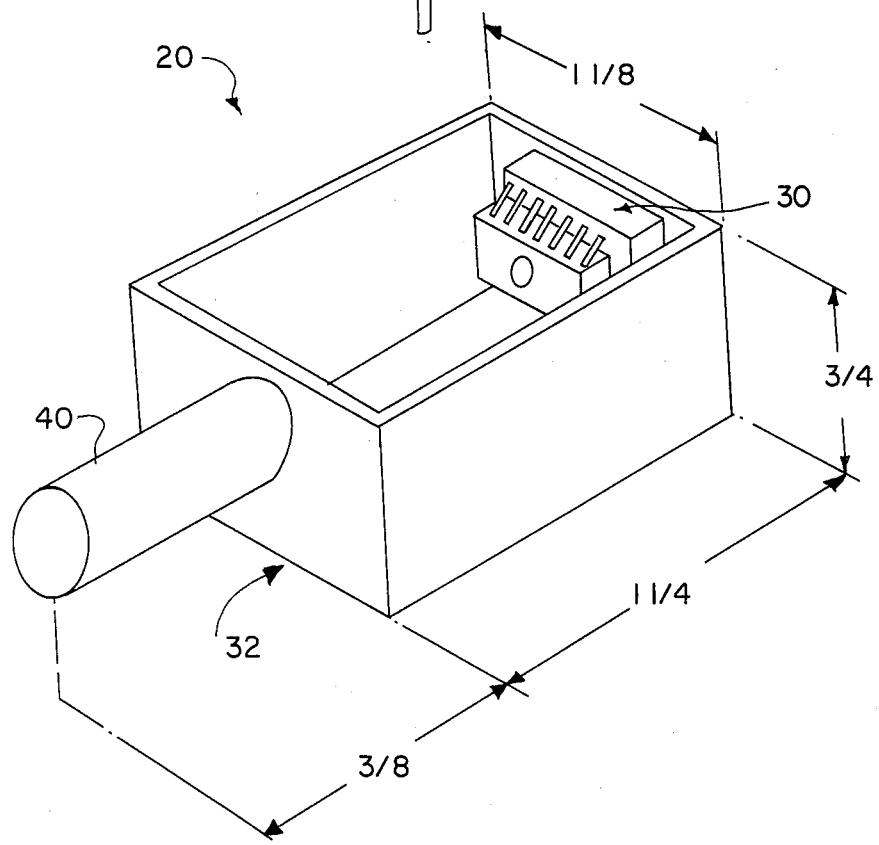
FIG. 2 is a perspective view of a camera used with the invention.

Referring to FIG. 2 the camera 20 is shown in greater detail and comprises a dynamic RAM sensing element 30 (Micron Technologies 64K Optic RAM Type 1S32). The element 30 produces a binary image with each pixel being either on or off depending on the amount of light falling on it. The camera 20 uses the drive hardware and software for the Apple IIe computer. The element 30 is received in a housing 32, at the rear portion thereof (top of housing not shown). The RAM is assembled with an 16 pin IC carrier, a 100 pF disc capacitor and a 470 pF disc capacitor and a 16 way ribbon cable (not shown). A lens 40 (D.O. Industries 13 mm F 1.8 Micro Lens) is secured to the front of the housing 32. It has a focusing range of about three inches to infinity.

In order to use a binary image, the scene which is being operated on must have a sharp change in contrast between the objects and the background. This is true with the component lead problem if the component is held against a dark background. A benefit of using a binary image is that the image algorithms used to find the objects in the scene can operate very fast since an object boundary is located where the scene changes from light to dark and vice versa.

The resolution of the dynamic RAM (integrated circuit) element is $128 \times 256$ pixels. The camera software allows sampling of every second pixel to yield a $64 \times 128$ image. This option was chosen since a fourfold reduction in image data and corresponding image processing time results.

It was found that in order to do an insertion of a typical electronic component a position accuracy of 0.005 to 0.010 inches (0.125 to 0.250 mm) is required, Sanderson et al supra. At a distance of 4 inches from an object, the camera has a field of view of approximately $\frac{1}{4} \times 1\frac{1}{4}$ inches. Using a $64 \times 128$ resolution image gives an effective resolution of approximately $0.005$ times $0.010$ inches ($0.125 \times 0.250$ mm). Therefore positioning the camera at a distance of 4 inches from the leads will give an adequate tolerance to insert the leads. Because of physical constraints, the camera was only allowed to be positioned at 12 inches from the leads in the tests described hereinafter. This gives an effective resolution of approximately $0.013 \times 0.029$ inches ($0.33 \times 0.74$ mm).

The other performance feature of the camera which should be noted is the speed of response of the camera or the time taken to obtain an image. The camera is a binary device. The pixels will either turn on or off depending on the intensity as well as the time which light is allowed to hit them. Therefore, in an atmosphere with a constant amount of light, a time threshold is used to give the best contrast between object and background. In typical room lighting, the time threshold as well as the image acquisition time was found to be generally between 100 and 200 milliseconds.

CAMERA MODELING AND CALIBRATION

A pinhole camera was chosen as a mathematical representation for the actual camera. This model was used to perform a camera calibration, which expresses the relationship between an object in world coordinates to it's corresponding camera coordinates.

There are several reasons for choosing a pinhole camera representation. Firstly, it is the most commonly used model in the literature Duda, R. O. supra, Nevatia, R., Machine Perception, Prentice-Hall, Inc., Englewood Cliffs, N.J., 1982. Another reason is that it is a relatively simple model to develop, especially if homogeneous coordinate transformations are used. An additional feature of this model is that it is easy to visualize.

As a result of this inherent simplicity, one of the questions which is commonly posed when using this model is that of accuracy. This question was investigated at great depth at the University of Rhode Island. Several alternative camera models were derived using two calibration planes. These models were tested for error and compared with the pinhole camera model Martins, H. "Vision Algorithms to Acquire Workpieces From a Bin of Parts", PhD Thesis, University of Rhode Island, 1982. These tests were done using several focal length lenses and several different cameras, of both solid state and vidicon varieties. The conclusion was that the vidicon cameras performed very poorly using the pinhole camera model, and performed significantly better using the two plane models. However, the solid state cameras were found to correspond well to the pinhole model, with an error of about one half of one pixel of the effective resolution. The two plane models applied to the solid state cameras did not show a significant improvement in accuracy.

Therefore, it was concluded that the pinhole camera model would be a reasonable one for this application since the optic RAM being used is a solid state device.

The following derivation of the forward and inverse camera models and camera calibration is based on the method presented in Duda, R. O. supra, with several enhancements which are noted in the following disclosure. (Note all cited publications are incorporated by reference in their entireties in this disclosure).

Forward Camera Model

Figure 3:
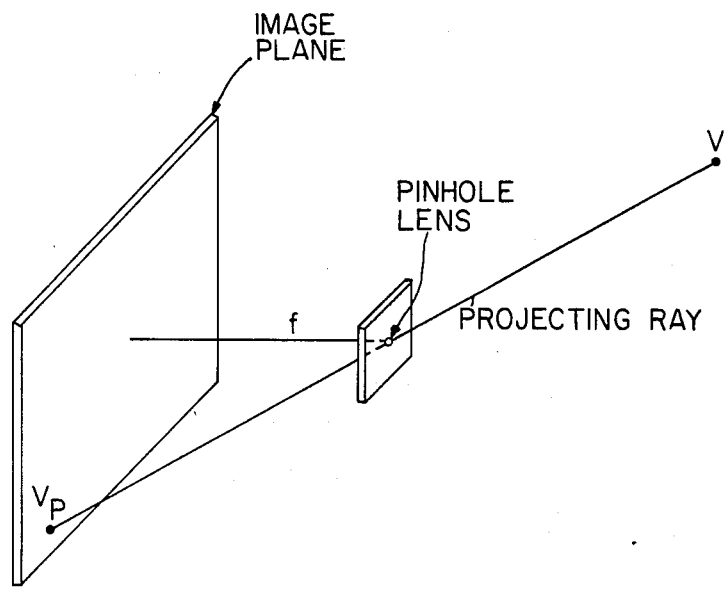
FIG. 3 is a schematic illustration of a pinhole camera model.

The pinhole camera model as shown in FIG. 3, consists of an image plane and a pinhole lens at a distance f from the image plane. In this model, when light is reflected off of an object at V, it travels along a projecting ray, passes through the pinhole lens and intersects the image plane at $V_p$. It is assumed that all rays of light which enter the camera and hit the image plane pass through the pinhole lens center. Therefore, in order to describe the pinhole camera physically, all that is required is to express the position and orientation of the image plane as well as the position of the pinhole lens in space.

Figure 4:
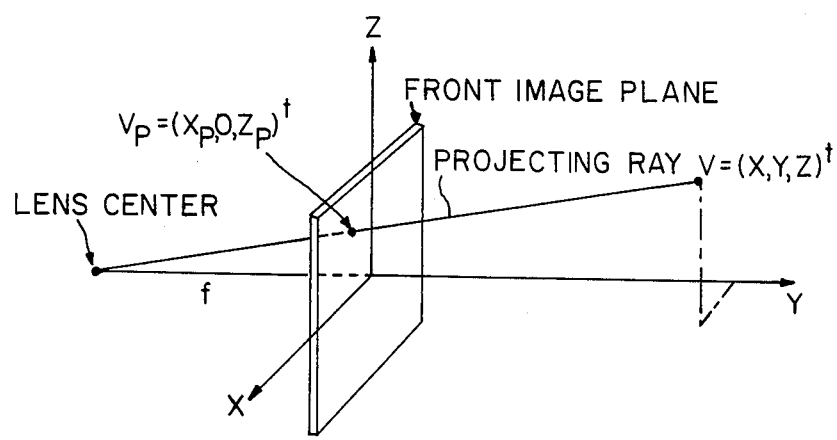
FIG. 4 is a schematic illustration of a pinhole camera expressed to a robot base.

As can be seen, if the position of an object in space is known, it is possible to determine where the corresponding image point on the image plane will lie. However, if the position of an image point which corresponds to an object in space is known, it is only possible to specify a ray along which the object must lie. The distance along the ray to the object, and hence the three dimensional position of the object, must be determined by other means. In order to express the pinhole camera mathematically, the image plane is shifted to a position a distance f in front of the lens center as shown in FIG. 4. This image plane gives an identical image to FIG. 3, but it is not inverted. This is called the front image plane. In addition, a cartesian coordinate system has been placed at the intersection of the front image plane and the principal ray, which is the ray from the lens perpendicular to the image plane.

Using the method of similar triangles, a relationship between the object point V and the image point $V_p$ can be found as follows $$\frac{x_p}{f} = \frac{x}{f+y} \tag{1}$$

$$y_p = 0$$

$$\frac{z_p}{f} = \frac{z}{f+y}$$

or $$x_p = \frac{fx}{f+y} \tag{2}$$

$$y_p = 0$$

$$z_p = \frac{fz}{f+y}$$

If the vector $V=(x,y,z)^t$ is expressed in homogeneous coordinates as $V=(x,y,z,1)$ the image vector $V_p$ may be expressed as V multiplied by the perspective transformation, P, where $$P = \begin{bmatrix} 1 & 0 & 0 & 0 \\ 0 & 1 & 0 & 0 \\ 0 & 0 & 1 & 0 \\ 0 & 1/f & 0 & 1 \end{bmatrix} \tag{3}$$

Therefore $V_p$ may be expressed as $$V_p = PV = \begin{bmatrix} 1 & 0 & 0 & 0 \\ 0 & 1 & 0 & 0 \\ 0 & 0 & 1 & 0 \\ 0 & 1/f & 0 & 1 \end{bmatrix} \begin{bmatrix} x \\ y \\ z \\ 1 \end{bmatrix} = \begin{bmatrix} x \\ y \\ z \\ (y/f)+1 \end{bmatrix} \tag{4}$$

or $$V_p = \begin{bmatrix} \frac{fx}{f+y} \\ \frac{fy}{f+y} \\ \frac{fz}{f+y} \\ 1 \end{bmatrix} \tag{5}$$

Notice that this agrees with eq. 2 except that the second component is not equal to 0. This fact will be discussed further when the Inverse Camera Model is explained. The remainder of this section is a deviation from the method in Duda, R. O. supra.

Since the camera is actually mounted on the robot manipulator, it is desired to express an object in space with respect to the base frame of the robot, instead of a frame on the image plane. In order to do this it is assumed that the camera is mounted on the $n^{th}$ link of the manipulator. It is also assumed that the camera will be translated and rotated with respect to the coordinate from on the $n^{th}$ link of the robot, but the camera will not be rotated about it's principal axis. This is a reasonable assumption which makes later analysis simpler.

To allow a point described with respect to the robot base frame to be expressed with respect to the camera frame, FIG. 4 the following expression is used.

$$V_p = PV = PRTT_n^{-1}V_o \tag{6}$$

where $$R = \begin{bmatrix} \cos\theta & \sin\theta & 0 & 0 \\ -\cos\phi\sin\theta & \cos\phi\cos\theta & \sin\phi & 0 \\ \sin\phi\sin\theta & -\sin\phi\cos\theta & \cos\phi & 0 \\ 0 & 0 & 0 & 1 \end{bmatrix} \quad (7)$$

$$T = \begin{bmatrix} 1 & 0 & 0 & t_1 \\ 0 & 1 & 0 & t_2 \\ 0 & 0 & 1 & t_3 \\ 0 & 0 & 0 & 1 \end{bmatrix}$$

$T_n^{-1} = \text{func}(\theta_1, \theta_2, \ldots, \theta_n$: *which is manipulator dependent*
$V_o$ = object point expressed with respect to manipulator base frame.

Here the transformation R represents a rotation of $\theta$ about the z axis, followed by a rotation of $\phi$ about the x axis. The T transform represents a translation of $t_1$, $t_2$, $t_3$ along the x, y and z axes, respectively. $T_n^{-1}$ represents the transformation from the base frame to the $n^{th}$ frame of the robot.

Now, the setup using a Puma robot (Model No. 600) will be described assuming the camera is mounted on the third link of the robot. This defines n to be 3. $T_n^{-1}$ can now be expressed as $$T_n^{-1} = T_3^{-1} = (A_1 A_2 A_3)^{-1}$$

where $A_1$, $A_2$ and $A_3$ are matrices from the kinematic joint solution which describe the transformations from the base to first, first to second and second to third frames, respectively.

Figure 5:
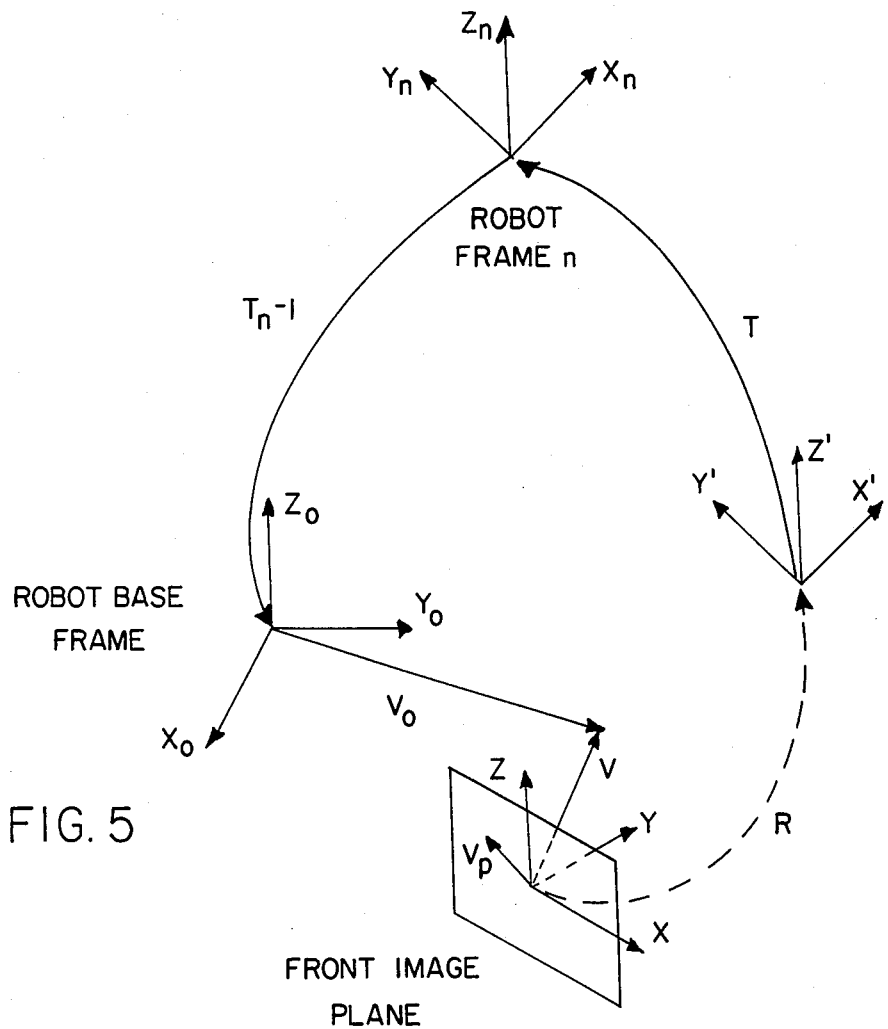
FIG. 5 is a representation of various image plane coordinates.

It is inconvenient, however, to express the image coordinates with respect to the coordinate system through the principal axis of the lens, since the rows and columns of the image are measured from one corner. A second translation matrix is introduced to translate the camera reference frame to the lower left corner of the image plane as shown in FIG. 5. Also a scaling matrix must be used since the pixels on the image plane are discrete units instead of continuous space. The transformations are applied to the camera model in the following way.

$$V_i = SO\, V_p = SOPRTT_3^{-1} V_o \quad (9)$$

where $$O = \begin{bmatrix} 1 & 0 & 0 & O_1 \\ 0 & 1 & 0 & 0 \\ 0 & 0 & 1 & O_3 \\ 0 & 0 & 0 & 1 \end{bmatrix} \quad (10)$$

$$S = \begin{bmatrix} S_1 & 0 & 0 & 0 \\ 0 & 1 & 0 & 0 \\ 0 & 0 & S_3 & 0 \\ 0 & 0 & 0 & 1 \end{bmatrix} \quad (11)$$

The multiplication of OPRT for the actual camera model is set forth below.

The forward camera transformation from world coordinates to image coordinates can be expressed as $$V_i = SOPRTT_3^{-1} V_o$$

where $V_i$ = image coordinates of a point expressed in homogeneous coordinates
$V_o$ = world coordinates of the same point expressed in homogeneous coordinates $$S = \begin{bmatrix} s_1 & 0 & 0 & 0 \\ 0 & 1 & 0 & 0 \\ 0 & 0 & s_3 & 0 \\ 0 & 0 & 0 & 1 \end{bmatrix} = \text{pixel scaling transformation}$$

$$O = \begin{bmatrix} 1 & 0 & 0 & o_1 \\ 0 & 1 & 0 & 0 \\ 0 & 0 & 1 & o_3 \\ 0 & 0 & 0 & 1 \end{bmatrix} = \begin{array}{l}\text{pixel coordinate translation} \\ \text{transformation}\end{array}$$

$$P = \begin{bmatrix} 1 & 0 & 0 & 0 \\ 0 & 1 & 0 & 0 \\ 0 & 0 & 1 & 0 \\ 0 & 1/f & 0 & 1 \end{bmatrix} = \text{perspective transformation}$$

$$R = \begin{bmatrix} \cos\theta & \sin\theta & \theta & \theta \\ -\cos\phi\sin\theta & \cos\phi\cos\theta & \sin\phi & \theta \\ \sin\phi\sin\theta & -\sin\phi\cos\theta & \cos\phi & \theta \\ \theta & \theta & \theta & 1 \end{bmatrix} = \begin{array}{l}\text{rotation} \\ \text{transformation}\end{array}$$

$$T = \begin{bmatrix} 1 & 0 & 0 & t_1 \\ 0 & 1 & 0 & t_2 \\ 0 & 0 & 1 & t_3 \\ 0 & 0 & 0 & 1 \end{bmatrix} = \text{translation transformation}$$

$$T_3^{-1} = A_3^{-1} A_2^{-1} A_1^{-1}$$

In order to simplify the determination of unknown parameters in OPRT by calibration, eq. A-1 will be expressed as $$S^{-1} V_i = [OPRT] T_3^{-1} V_o$$

To simplify the calculation of OPRT, the following substitutions are made in R $r_1 = \cos\theta$ $r_2 = \sin\theta$ $r_3 = \cos\phi$ $r_4 = \sin\phi$ It should be noted that the common trigonometric identity $\cos\theta = 1/\sin\theta$ is not used here. This is because the values of the parameter matrix which will be yielded by the calibration procedure will be approximate and there will be no guarantee that the identity will be true. Therefore R simplifies to $$R = \begin{bmatrix} r_1 & r_2 & 0 & 0 \\ -r_2 r_3 & r_1 r_3 & r_4 & 0 \\ r_2 r_4 & -r_1 r_4 & r_3 & 0 \\ 0 & 0 & 0 & 1 \end{bmatrix}$$

Before multiplying OPRT, the calculations of OP and RT are done as shown.

$$OP = \begin{bmatrix} 1 & o_1/f & 0 & o_1 \\ 0 & 1 & 0 & 0 \\ 0 & o_3/f & 0 & o_3 \\ 0 & 1/f & 0 & 1 \end{bmatrix}$$

$$RT = \begin{bmatrix} r_1 & r_2 & 0 & t_1r_1+t_2r_2 \\ -r_2r_3 & r_1r_3r_4 & -r_4 & -t_1r_2r_3+t_2r_1r_3+t_3r_4 \\ r_2r_4 & -r_1r_4r_3 & r_1r_2r_4-t_2r_1r_4+t_3r_3 \\ 0 & 0 & 0 & 1 \end{bmatrix}$$

The product of OPRT is given by $$OPRT = \begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix}$$

where $A_{11} = r_1 + (-o_1r_2r_3)/f$ $A_{12} = R_2 + (o_1r_1r_3)/f$ $A_{13} = (o_1r_4)/f$ $A_{14} = t_1r_1 + t_2r_2 + o_1([(-t_1r_2r_3+t_2r_1r_3+t_3r_4)/f]+1)$ $A_{21} = -r_2r_3$ $A_{22} = r_1r_3$ $A_{23} = r_4$ $A_{24} = -t_1r_2r_3 + t_2r_1r_3 + t_3r_4$ $A_{31} = r_2r_4 + (-o_3r_2r_3)/f$ $A_{32} = -r_1r_4 + (o_3r_1r_3)/f$ $A_{33} = r_3 + (o_3r_4)/f$ $A_{34} = t_1r_2r_4 - t_2r_1r_4 + t_3r_3 + o_3([(-t_1r_2r_3+t_2r_1r_3+t_3r_4)/f]+1)$ $A_{41} = -(r_2r_3)/f$ $A_{42} = (r_1r_3)/f$ $A_{43} = r_4/f$ $A_{44} = [(-t_1r_2r_3+t_2r_1r_3+t_3r_4)/f] + 1$

Inverse Camera Model

If the coordinates of a point in space are known with respect to a base frame, the corresponding image coordinates may be determined using eq. 9. However, in general, the image coordinates of the object in space are known with respect to the image frame from the camera. It is the coordinates of the object in space which are required. In order to yield this information, the inverse of eq. 4 is taken to give $$V = P^{-1}V_p = \begin{bmatrix} 1 & 0 & 0 & 0 \\ 0 & 1 & 0 & 0 \\ 0 & 0 & 1 & 0 \\ 0 & -1/f & 0 & 1 \end{bmatrix} \begin{bmatrix} x_p \\ y_p \\ z_p \\ 1 \end{bmatrix} \quad (12)$$

When using the forward camera model, $y_p$, the second coordinate of the image point as calculated with forward perspective transformation eq. 5 does not correspond to the actual camera where $y_p=0$ (eq. 2). Therefore a question to be answered is: When using the inverse perspective transformation (eq. 12) what should be used for the second component of $V_p$? It can be shown that if $y_p=0$ is used for the image point in eq. 12, it yields $V=(x_p,0,z_p)$. This is not reasonable since what is desired is to map a point on the image plane into a ray in space instead of a single point.

Therefore, as suggested by eq. 5, $y_p$ is entered into eq. 12 with $$y_p = \frac{fy}{f+y} \quad (13)$$

This suggests that $y_p$ should be used as a free parameter which is related to y, the distance between the object point and the image plane (FIG. 4). If eq. 13 is substituted into eq. 12 as $y_p$, the result for V is $$V = \begin{bmatrix} \dfrac{x_p(y+f)}{f} \\ y \\ \dfrac{z_p(y+f)}{f} \\ 1 \end{bmatrix} = \begin{bmatrix} x \\ y \\ z \\ 1 \end{bmatrix} \quad (14)$$

This is the same result which was obtained using the similar triangle approach in eq. 1.

It can be shown that as y is varied, $y_p$ from eq. 13 will exhibit the following behavior. At the lens center, when $y=-f$, $y_p=-\infty$ When $y=0$, at the picture plane, $y_p=0$. Far out along an image ray, when $y=\infty$, $y_p=f$.

The reason for this apparent discontinuity in the free parameter stems from the fact that the homogeneous coordinate transformation is meant to map from one three dimensional space to another. In the case of the camera model, the transform is actually mapping from three dimensions (the object space) to two dimensions (the image space). There is a loss of one dimension in the forward camera model. Therefore, when the inverse camera model is used, a free parameter must be entered to allow for this lost dimension. This free parameter must be determined by other means such as knowing which plane an object lies on, or by using laser or stereoscopic rangefinding techniques.

Figure 6:
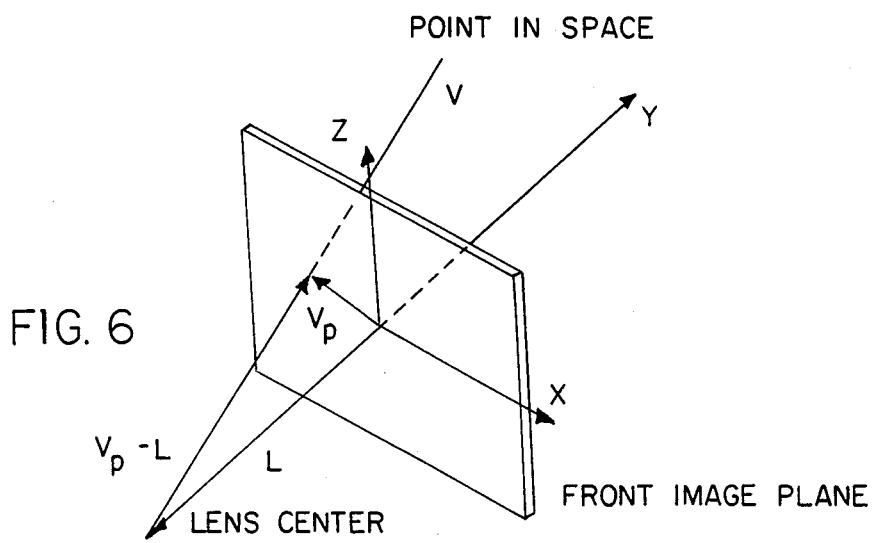
FIG. 6 is an illustration of an alternate camera model.

The inverse perspective transformation can be expressed in an alternate form (FIG. 6) by rewriting V as $$V = L + lam(V_p - L) \quad (15)$$

where L is the lens center which is found by letting $y_p$ approach minus infinity in eq. 12 $V_p$ is the image point on the image plane, with respect to the reference frame. This is found by setting $y_p=0$ in eq. 12. This is a convenient form, as the object point can be found by following a ray in the direction of $V_p-L$ from L by a distance lam which is related to y.

This discussion can be applied to the situation where the camera is mounted on the third link of the manipulator. To derive the inverse camera transform for this case, the inverse of eq. 9 is taken, yielding $$V_o = T_3T^{-1}R^{-1}P^{-1}O^{-1}S^{-1}V_i \quad (16)$$

To form eq. 15 for this case, L and $V_p$ are found by letting $y_i=-\infty$ and O, respectively. A sample calculation of L and $V_p$ is set forth below.

The inverse camera transformation from image coordinates to world coordinates is given by $$V_o = T_3 T^{-1} R^{-1} P^{-1} O^{-1} S^{-1} V_i \tag{B-1}$$

This may be represented by $$\begin{bmatrix} x_o \\ y_o \\ z_o \\ w \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix} \begin{bmatrix} x_i \\ y_i \\ z_i \\ 1 \end{bmatrix} \tag{B-2}$$

The coordinates of an image point on the image plane, with respect to the robot base frame are found by letting $y_i=0$. Letting $y_i=0$ in eq. B-2 and renaming this to $V_p$ gives $$x_p = C_{11}x_i + C_{13}z_i + C_{14} \tag{B-3}$$
$$y_p = C_{21}x_i + C_{23}z_i + C_{24}$$
$$z_p = C_{31}x_i + C_{33}z_i + C_{34}$$
$$w = C_{41}x_i + C_{43}z_i + C_{44}$$

The coordinates of the lens, with respect to the robot base frame are found by letting $y_i=\infty$. Making this substitution and renaming as L gives $$x_1 = C_{12} \tag{B-4}$$
$$y_1 = C_{22}$$
$$z_1 = C_{32}$$
$$w = C_{42}$$

CAMERA CALIBRATION

Determination Of Parameter Matrix

A suitable mathematical model for the camera has now been developed, the parameters which define this model (such as O, O, $t_1$, $t_2$, $t_3$, f, etc.) must be determined. One method of doing this is to physically measure the parameters. This is not feasible for most of these parameters since the quantities that are being measured, such as lens center and principal axis, are quite abstract. A more reasonable method would be to gather a number of world point locations as well as their corresponding image locations and use a statistical method, such as least squares, to determine the best correlation between the parameters.

In order to lessen the number of parameters which must be determined, the two elements of the scaling matrix, S, may be calculated based on the data which is distributed with the DRAM chips. These parameters were found to be $$S_1 = 36.2 \text{ pixels/mm} \tag{17}$$
$$S_2 = 91.25 \text{ pixels/mm}$$

The matrix $T_3^{-1}$ is also known by measuring the first 3 joint coordinates of the robot, assuming that these joint angles did not change during calibration. It is assumed that n correspondences will be found between object and image points.

To find the remaining parameters, the following expression will be used from the forward camera model $$S^{-1}V_i = OPRT(T_3)^{-1} V_o \tag{18}$$

This equation is restated in the following form.

$$V' = HV \tag{19}$$

$$(3 \times n) \quad (3 \times 4)(4 \times n)$$

where $V'$ is a $3 \times n$ matrix whose columns consist of the n vectors $S^{-1}V_i$ expressed in homogeneous coordinates v is a $4 \times n$ matrix whose columns are the n vectors of $T_3^{-1}V_o$. H is defined to be the product of OPRT with the second row deleted. The second row of OPRT must be deleted when forming H since when measuring $V'$ the values of the free parameter $y_p$ are not known and thus must be ignored. The values of the second row of OPRT must be determined by an alternate method.

This situation is more correctly defined as $$HV = V'D \tag{20}$$

where D is a diagonal scaling matrix. This matrix is necessary since the scaling of the last component of each point in homogeneous coordinates may not be the same. The optimal solution is given from Duda, R. O., supra as $$A = V^t(VV^t)^{-1}V - I \tag{21}$$

$$Q = (V')^t V' \tag{22}$$

Let S be a matrix whose (i,j)th element $s_{ij} = a_{ij}dq_{ji}$. Note that this is not common matrix multiplication. Let the n dimensional vector d have as its components the n diagonal elements of D. The solution to D is found from the homogeneous system $$Sd = 0 \tag{23}$$

The matrix H may then be determined from $$H = V'DV^t(VV^t)^{-1} \tag{24}$$

Determination Of Focal Length Parameter F

The parameter matrix, H, has been computed, which is equivalent to the product of OPRT with the second row deleted. In order to calculate the second row of OPRT, the parameter f must be determined.

The procedure to find f is to equate respective elements of H and OPRT. This yields 12 equations in 10 unknowns which may be solved for the parameter f. The result is a nonlinear equation in f and the known elements of H. This equation is solved for f using the method of bisection with a reasonable starting segment. This procedure is set forth below.

H as calculated by the CALIBRATE program can be defined as $$H = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix}$$

Equating elements of H and OPRT given in Appendix 1 gives $$h_{11} = r_1 + (-o_1 r_2 r_3)/f \tag{C-2a}$$
$$h_{12} = r_2 + (o_1 r_1 r_3)/f \tag{C-2b}$$
$$h_{13} = (o_1 r_4)/f \tag{C-2c}$$

$$h_{14} = t_1 r_1 + t_2 r_2 + o_1([(-t_1 r_2 r_3 + t_2 r_1 r_3 + t_3 r_4)/f] + 1) \quad \text{(C-2d)}$$

$$h_{21} = r_2 r_4 + (o_3 r_2 r_3)/f \quad \text{(C-2e)}$$

$$h_{22} = -r_1 r_4 + (o_3 r_1 r_3)/f \quad \text{(C-2f)}$$

$$h_{23} = r_3 + (o_3 r_4)/f \quad \text{(C-2g)}$$

$$H_{24} = t_1 r_2 r_4 - t_2 r_1 r_4 + t_3 r_3 + o_3([(-t_1 r_2 r_3 + t_2 r_1 r_3 + t_3 r_4)/f] + 1) \quad \text{(C-2h)}$$

$$h_{31} = -(r_2 r_3)/f \quad \text{(C-2i)}$$

$$h_{32} = (r_1 r_3)/f \quad \text{(C-2j)}$$

$$h_{33} = r_4/f \quad \text{(C-2k)}$$

$$h_{34} = [(-t_1 r_2 r_3 + t_2 r_1 r_3 + t_3 r_4)/f] + 1 \quad \text{(C-2l)}$$

From eqs. C-2k, C-2j, C-2i, respectively $$r_4 = f h_{33} \quad \text{(C-3a)}$$

$$r_1 r_3 = f h_{32} \quad \text{(C-3b)}$$

$$r_2 r_3 = -f h_{31} \quad \text{(C-3c)}$$

Eqs. C-2a and C-2b give $r_1$ and $r_2$ as $$r_1 = h_{11} - o_1 h_{31} \quad \text{(C-3d)}$$

$$r_2 = h_{12} - o_1 h_{32} \quad \text{(C-3e)}$$

Substituting eqs. C-3d into C-3b yields $r_3$ below $$r_3 = f h_{32}/(h_{11} - o_1 h_{31}) \quad \text{(C-3f)}$$

Substituting eqs. C-3d and C-3e into C-2e and C-2f gives $$h_{21} = h_{12} f h_{33} - o_1 h_{32} f h_{33} + o_3 h_{31} \quad \text{(C-3g)}$$

$$h_{22} = -h_{11} f h_{33} + o_1 h_{31} f h_{33} + o_3 h_{32} \quad \text{(C-3H)}$$

Multiplying eq. C-3h by $h_{31}$ and substracting it from the product of eq. C-3g and $h_{32}$ gives $o_1$ as $$o_1 = \frac{f h_{33}(h_{32} h_{12} + h_{11} h_{31}) + (h_{22} h_{31} - h_{32} h_{21})}{f h_{33}(h_{32}^2 + h_{31}^2)} \quad \text{(C-3i)}$$

Multiplying eq. C-3h by $h_{32}$ and adding it to the product of eq. C-3g and $h_{31}$ gives $o_3$ as $$o_3 = \frac{f h_{33}(h_{32} h_{11} - h_{12} h_{31}) + (h_{21} h_{31} + h_{32} h_{22})}{h_{32}^2 + h_{32}^2} \quad \text{(C-3j)}$$

Substituting C-3f, C-3j, C-3a and C-3i into eq. C-2g gives a nonlinear equation in f as $$F(f) = ((h_{11} - h_{31}[(B/A) + (C/(f h_{33} A))])(h_{23} - f h_{33} \cdot D + E] h_{33}/A)/h_{32}) - f \quad \text{(C-4)}$$

where A, B, C, D and E are defined as follows $$A = h_{32}^2 + h_{31}^2$$

$$B = h_{32} h_{12} + h_{11} h_{31}$$

$$C = h_{22} h_{31} - h_{32} h_{21}$$

$$D = h_{32} h_{11} - h_{31} h_{12}$$

$$E = h_{31} h_{21} + h_{32} h_{22}$$

This equation is used in a bisection routine to determine f.

Once the parameter f is found, the remaining elements of OPRT may be computed. This matrix may now be inverted to yield the inverse camera model, which is the final product of the calibration procedure.

SOFTWARE

In the following two sections, the calibration program and the forward camera model program will be presented. Complete program listings are set forth in the Appendix. The calibration program is used to determine the parameters of the camera model as outlined in the previous section. The forward camera model program is used after the calibration routine to determine the adequacy of the computed camera model. The FORWARD routine calculates the pixel coordinates of a point in world space and may then be compared to an actual image of the point in world space. If the camera model is good, there should be a discrepancy of not more than one pixel between the images.

Because the camera hardware interfaces with the Apple IIe microcomputer, the high level routines were written in Applesoft Basic. These routines use matrix algebra since this is the form of the homogeneous coordinate representation. However, a separate matrix multiplication subroutine was not written since the Applesoft Basic language does not allow passing of variable arguments in subroutines. Each matrix multiplication therefore was written directly in the main program and makes the programs much longer than they would have been if a matrix algebra subroutine was available.

Another facet of the Apple IIe which should be mentioned is the limited amount of memory available. The CALIBRATE program and it's associated variables are of sufficient size such that when the program is run, a portion of the memory where the low level machine language routines are stored is overwritten. These machine language routines are mainly used to obtain the image from the camera and to extract the relevant data from the image. Therefore, in use the CAMERA program must be run and it's data must be stored in an intermediate location such as a data file on disk. Then the CALIBRATE program may be run and must first retrieve the camera data from disk.

It should also be noted that the Applesoft language uses only the first two letters of a variable name to distinguish between variables. Therefore, in order to keep variables separate, but in order to still use meaningful variable names, the first two letters of a name are used for distinguishing the variable followed by a more meaningful character code. This fact may be helpful when reading the computer code in the appendixes.

Finally, these programs allow for various forms of data inputs, such as entering image data from the camera, from the keyboard or from a data file. This facility is useful when making changes to, and debugging the programs, since a continuous image might not be available or necessary but the camera data can be recorded and entered from the keyboard.

CALIBRATE Program

In order to start the calibration process a set of points in space must be chosen, the location of which will be found using the robot manipulator. When these locations are found, (HOW) they must be entered into a data file to be read by the CALIBRATE program. The manipulator then goes to each of these positions while holding a pointer. The image of the pointer on the image plane is found and stored on a data file by using the CAMERA routine. This is explained in detail in Experimental Procedure.

Now the CALIBRATE program may be run, since the image and object data have been stored. The first task which the program does is to read the image data and multiply it by the corresponding pixel scaling factor from matrix S before assigning it to the $V_i$ variable. Next the robot location data is read and is assigned to V. Finally, the first 3 joint coordinates from the robot are entered.

The program now premultiplies the matrix V, of object location vectors $(^OT_3)^{-1}$ to express the object locations with respect to the third link of the manipulator. This is necessary since it is desired to calibrate the camera with respect to a reference to which it is fixed. This is done in order that the camera model will be valid regardless of the configuration which the manipulator takes. The following section is a deviation to the method described in Duda, R. O., supra.

The following expression is evaluated.

$$A = V^t(VV^t)^{-1}V - I \tag{21}$$

It was found that in taking the inverse of the product $VV^t$, very inaccurate values were received, indicating that the matrix $VV^t$ is nearly singular or that the system is very ill conditioned. The cause of this ill conditioning is due to the points being physically very close together yet being, in a collective sense, very far from the origin of frame 3.

In order to decrease this ill condition, it is necessary to decrease this relative distance. A method of doing this is to introduce a new coordinate frame very close to the points, in a relative sense, and to express the points with respect to this new frame. An obvious choice of a frame near the points is to translate frame 3 of the robot so that it's origin corresponds with the first object point in space. This intermediate transformation is therefore defined to be $$Mid = \begin{bmatrix} 1 & 0 & 0 & x_1 \\ 0 & 1 & 0 & y_1 \\ 0 & 0 & 1 & z_1 \\ 0 & 0 & 0 & 1 \end{bmatrix} \tag{25}$$

where $(x_1, y_1, z_1)$ are the coordinates of the first object point with respect to frame 3.

The current object points $T_3^{-1}V$ can be expressed with respect to the intermediate frame by premultiplying by $Mid^{-1}$. Now the following statement may be made equating the representations of the object points $$T_3^{-1}V = Mid(Mid)^{-1}T_3^{-1}V \tag{26}$$

Substituting this expression into the forward camera model in eq. 9 yields $$V_i = SOPRT\ Mid(Mid)^{-1}T_3^{-1}V \tag{27}$$

Therefore to perform the calibration and reduce the ill conditioning, V in eq. 21 is used as $(Mid)^{-1}T_3^{-1}V$. Next, the calculation of eq. 21 is made, which was found to significantly decrease the ill conditioning.

The calibration procedure continues with the calculation of $$Q = V_i / V_i \tag{22}$$

Then the matrix S is determined as $$S_{ij} = A_{ij}Q_{ji} \tag{28}$$

where it is noted that this is an element by element multiplication instead of the classical matrix multiplication.

Next the vector d is computed by solving the homogeneous system $$Sd = 0 \tag{23}$$

using the homogeneous equation subroutine. Finally H is calculated using eq. 24

$$H = V_i DV^t(VV^t)^{-1} \tag{24}$$

The elements of H may be rearranged to form the nonlinear equation given in Appendix C. This nonlinear equation is solved using the bisection technique with an initial segment of $-1 < f < 100$. Having calculated f, the rest of the elements in the forward camera model can be determined from eq. C-4. This new H matrix can be defined from eq. 27 as $$H = OPRT\ Mid \tag{29}$$

It should be noted that the solution for the parameter f, given by eq. C-4, may still be used even though H was defined as OPRT instead of as in eq. 29. This is so because none of the parameters from column 4 of H are used to determine f. These elements are the only ones which would be effected by the postmultiplication by Mid. Therefore, the forward camera transform is given by $$OPRT = H\ Mid^{-1} \tag{30}$$

This transform is now stored on disk for use by the FORWARD program.

Figure 7:
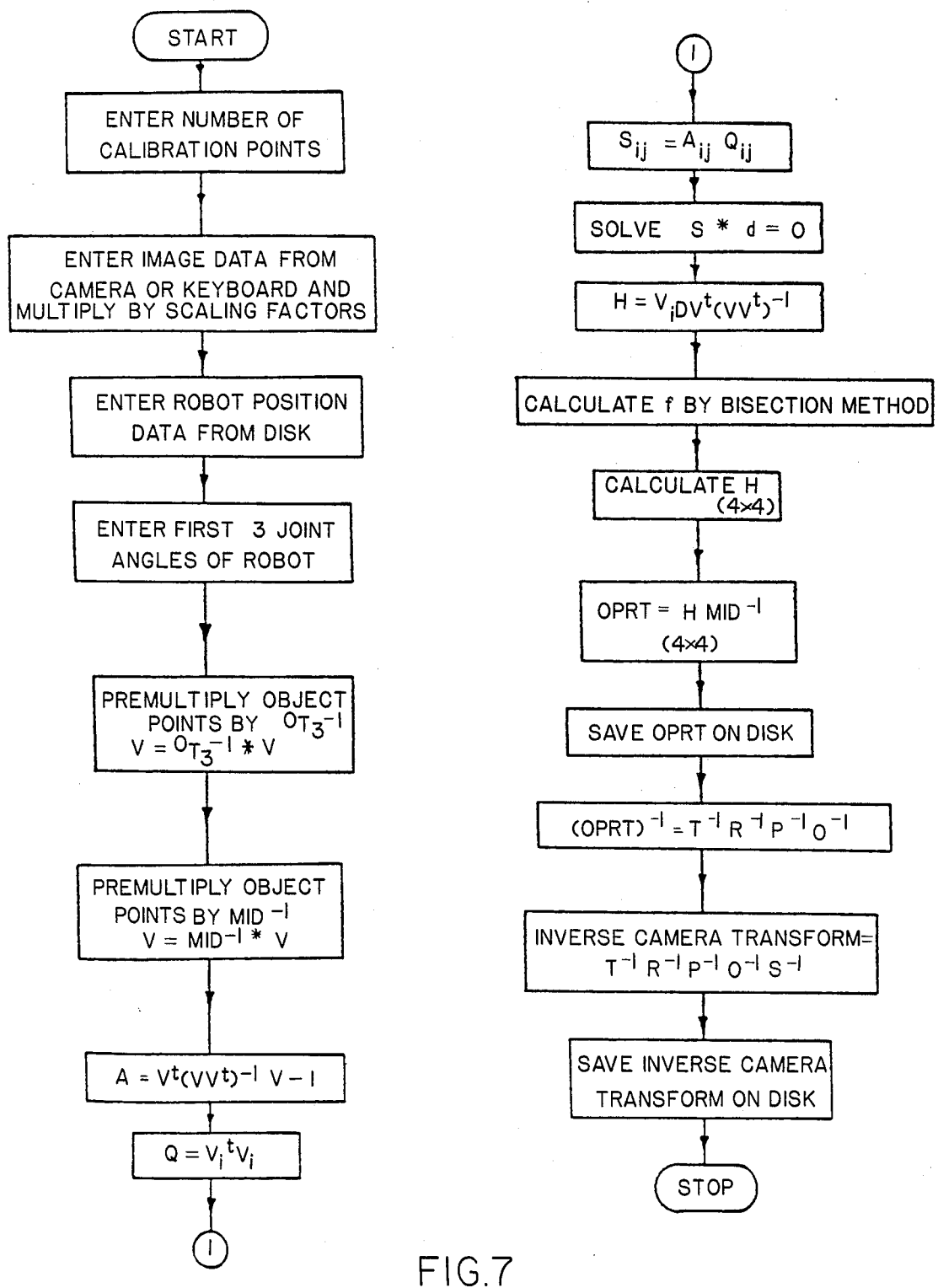
FIG. 7 is a flow chart of the program CALIBRATE.

The inverse camera transform is now found by taking the inverse of OPRT and postmultiplying by $S^{-1}$ to give $T^{-1}R^{-1}P^{-1}O^{-1}S^{-1}$. This quantity is now stored on disk for use by the STEREO program. A flowchart of CALIBRATE is shown in FIG. 7 as well as the program listing in the Appendix.

FORWARD Program

The purpose of the FORWARD routine is to compare the actual image data given by the camera with the image points which are calculated from known object points. This routine first asks for the configuration of the robot and the rotation angle to yield the second image. Then the program reads the forward camera transform from disk. Next the routine must compute the camera transform of the second image. This is done with the relation below $$Cam_2 = SOPRT\ ^3T_6(A_6)^{-1}(^3T_6)^{-1} \tag{31}$$

and the image point is computed with $$V_{i2} = SOPRT\ ^3T_6(A_6)^{-1}(^3T_6)^{-1}(^OT_3)^{-1}V_o \tag{32}$$

The derivation of this relation is set forth below under ACQUISITION OF THE SECOND IMAGE.

Figure 8:
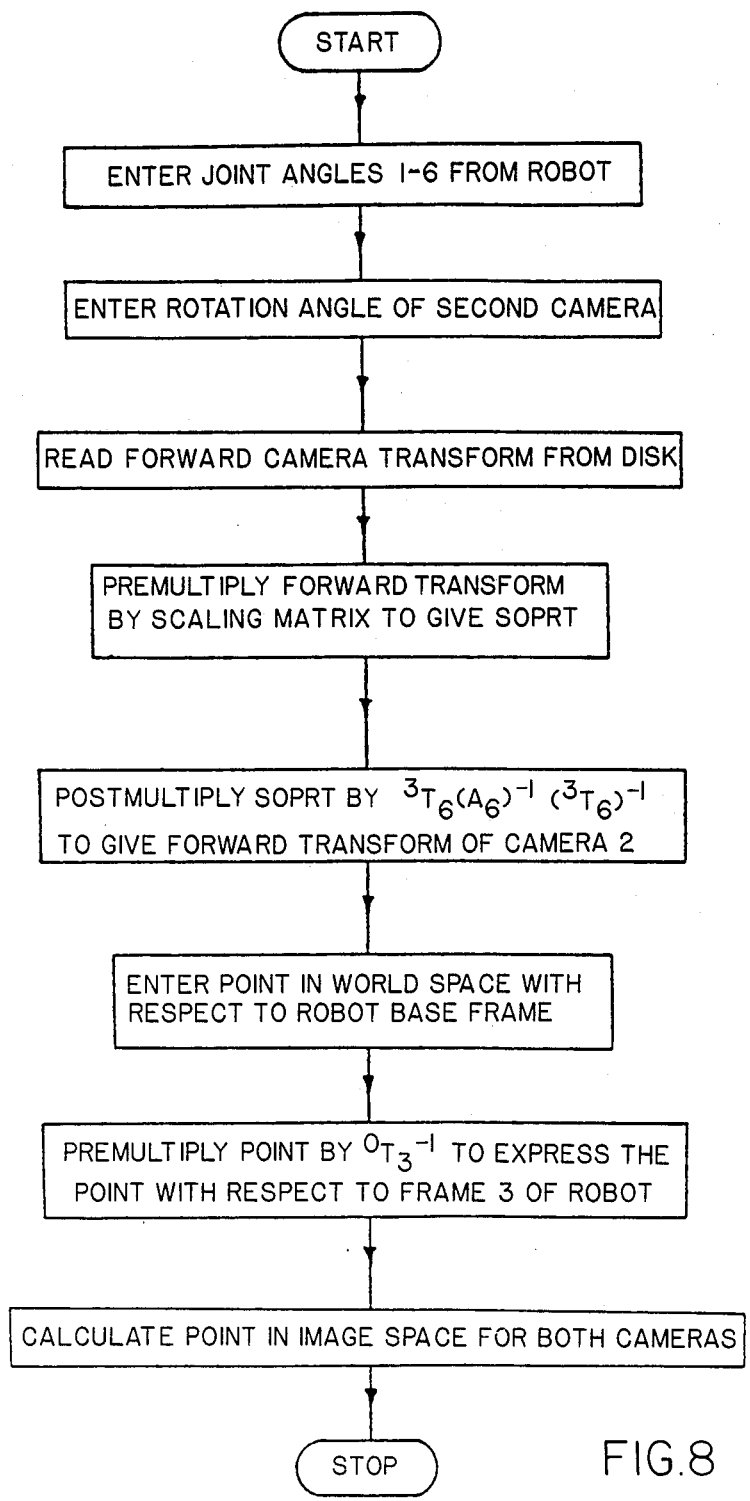
FIG. 8 is a flow chart of the program FORWARD.
Figure 11:
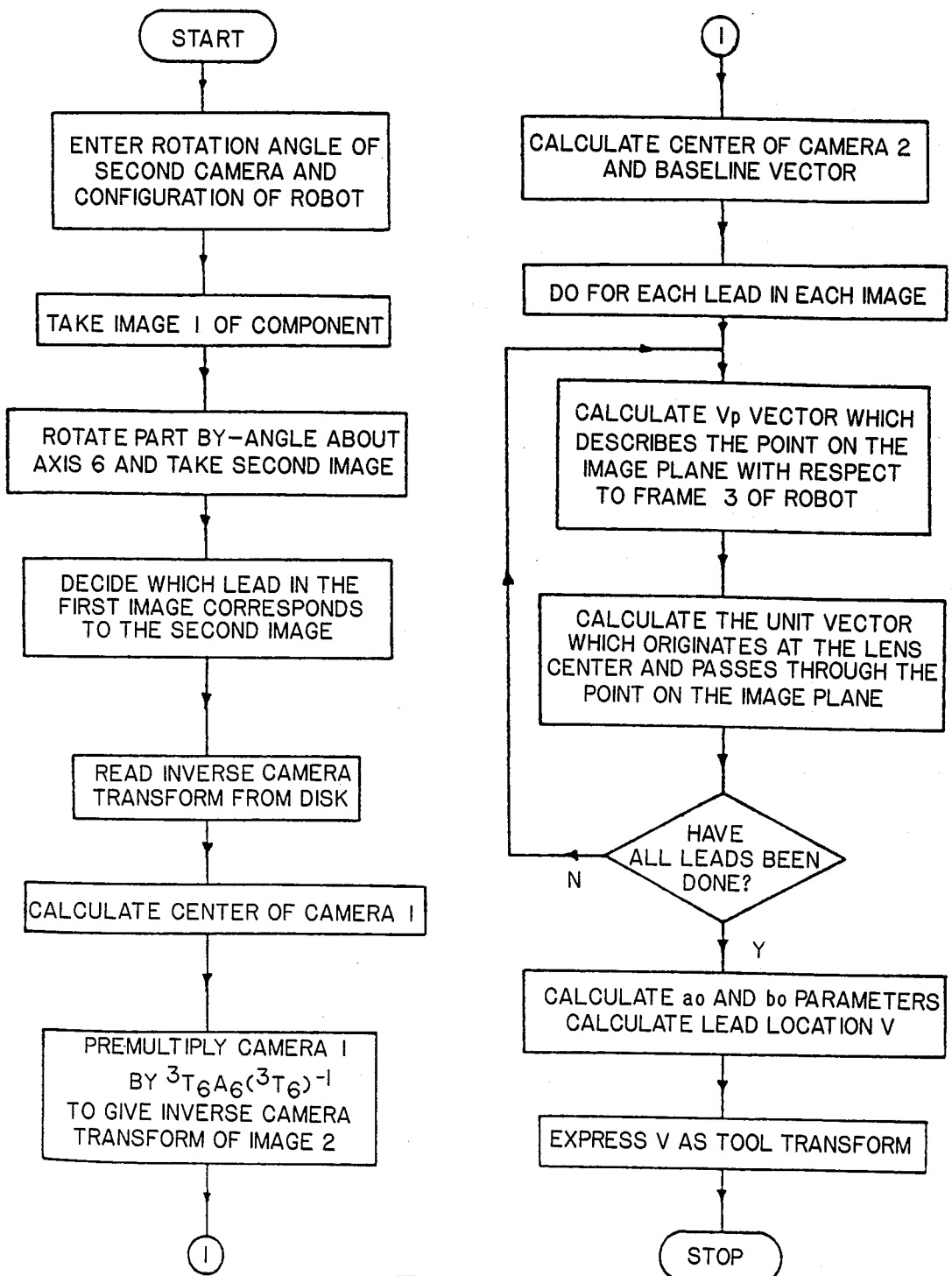
FIG. 11 is a flowchart of the program STEREO.

The user is now prompted to enter the coordinates of the object point with respect to the robot base frame. The point is premultiplied by $(^OT_3)^{-1}$ to express it with respect to the third frame of the robot. Finally, the image points for the 2 cameras are computed using eqs. (9) and (32). A flowchart of the FORWARD program is shown in FIG. 8 as well as the program listing in the Appendix.

Stereoscopic Triangulation

BASIC STEREO ARRANGEMENT

The inverse pinhole camera model using one image cannot uniquely determine the location of an object in its field of view. The distance which the object lies along the projecting ray must be determined. However, using two images of the same object, there is a standard triangulation technique which can be used to yield the three dimensional location of the object. The following method is based on the presentation in Duda, R.O., supra.

The basic method uses two cameras which have both been calibrated as in the previous section. Referring to FIG. 9 the location of the two lens centers are given by vectors $L_1$ and $L_2$, where the baseline vector $Del = L_2 - L_1$. The vectors $U_1$ and $U_2$ are unit vectors in the direction of the projecting rays. The lengths of the rays to the object point are given by a and b, respectively. $V_o$ is the location of the object point in space which is the desired result.

From FIG. 9, it may be seen that $$aU_1 = Del + bU_2 \tag{33}$$

since the two rays intersect. In reality, the two rays may not intersect mainly because distances on the two image planes are measured using discrete units instead of continuous units. Therefore, the best goal which can be achieved is to define $V_o$ to be half of the distance between the two rays at the point where they are closest to one another. This gives $V_o$ to be $$V_0 = \frac{a_0 U_1 (\text{Del} + b_0 U_2)}{2} + L_1 \tag{34}$$

where $a_o$ and $b_o$ are values of a and b which minimize $$J(a,b) = \| aU_1 - (Del + bU_2) \|^2 \tag{35}$$

As a result, $$a_0 = \frac{U_1 \text{Del} - (U_1 U_2)(U_2 \text{Del})}{1 - (U_1 U_2)^2} \tag{36}$$

$$b_0 = \frac{(U_1 U_2)(U_1 \text{Del}) - (U_2 \text{Del})}{1 - (U_1 U_2)^2}$$

and the unit vectors are given by $$U_j = \frac{V_{ij} - L_j}{\|V_{ij} - L_j\|} \tag{37}$$

Therefore, to calculate the object location, $V_o$, from two images first express the points on the image plane with respect to the external reference frame using eq. 26. Then compute the location of the camera lens centers using eq. 27. Now the unit vectors $U_1$ and $U_2$ may be found from eq. 28. Next compute the optimal ray lengths using eq. 27. Finally substitute into eq. 25 to find the object location.

ACQUISITION OF SECOND IMAGE

It is customary when doing stereo rangefinding to use two fixed cameras to acquire the two images. This is expensive since two cameras and interfaces are needed. In the invention herein the component is being viewed while it is being held by the manipulator and the camera is mounted on the manipulator, another different image is generated by rotating the part about one of the axes of the robot. This eliminates the need for a second camera. The images are taken with the same camera. The camera model which was determined from calibration will be the same except that it will be transformed to a different location and orientation.

In order to stimulate the dual camera arrangement of FIG. 9, the object should be rotated about an axis which is approximately perpendicular to the camera axis. An image taken, with camera 1, of the leads rotated through an angle $\theta$ is equivalent to an image taken of the unrotated leads by camera 2, which is camera 1 rotated by angle $-\theta$ about axis of rotation.

This situation is represented by FIG. 10 using homogeneous coordinate transformations. In the figure the axis of rotation is $z_n$ which is also the coordinate system from which the camera model is referenced. In case 1, the object point $V_n$ is rotated by angle $\theta$ about $z_n$ represented by the transform $rot(z_n,\theta)$. In order to express the object point $V_n$ with respect to the camera frame $x_p$, $z_p$, the following expression is used $$V_p = PRT \, rot(z_n,\theta) V_n \tag{38}$$

In case 2, the object is not rotated, but the camera is rotated about $z_n$ by an angle of $-\theta$. This rotation is represented by the transformation $rot(z_n,-\theta)$. Now to express the object point with respect to camera frame $x_p$, $z_p$ the following expression must be used.

$$V_p = PRT(rot(z_n,-\theta))^{-1} V_n \tag{39}$$

Since the assumption has been made that these two cases are equivalent, the images will be the same and eq. 38 can be set equal to eq. 39.

It this is done the resulting expression is $$rot(z_n,\theta) = (rot(z_n,\theta))^{-1} \tag{40}$$

Therefore, for our assumption to hold, eq. 40 must be true. This will be proven below. By definition $rot(z_n,\theta)$ is given by $$Rot(z,\theta) = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \tag{41}$$

$Rot(z,-\theta)^{-1}$ is given by $$Rot(z,-\theta)^{-1} = \begin{bmatrix} \cos(-\theta) & \sin(-0) & \theta & 0 \\ -\sin(-\theta) & \cos(-0) & \theta & 0 \\ 0 & 0 & 1 & 0 \\ 0 & 0 & 0 & 1 \end{bmatrix} \tag{42}$$

Using the trigonemetric identities $$\cos(-\theta) = \cos\theta \quad (43)$$

$$\sin(-\theta) = -\sin\theta$$

it can be easily seen that 41 and 42 are equivalent.

In actual application using the Puma robot, axis 6 is the most convenient axis about which the object may be rotated. To express the rotation of the second camera about axis 6, first the camera transformation must be premultiplied by $(^3T_6)^{-1}$ to express the camera transform with respect to axis 6. Next the rotation about axis 6 of $-\theta$ is performed by premultiplying by $A_6(-\theta)$, which is the homogeneous transform representation of a rotation about axis 6 of the Puma robot by $-\theta$ degrees. Finally the model must be premultiplied by $^3T_6$ to express it with respect to frame 3 again. Therefore the total inverse camera transformation for camera 2 is given by $$V_o = {}^OT_3 {}^3T_6 A_6(-\theta)(^3T_6)^{-1} T^{-1} R^{-1} P^{-1} O^{-1} S^{-1} V_i \quad (44)$$

To determine the optimal angle to rotate the component through a triangulation method is used based on finding the intersection of 2 rays whose positions are not completely accurate. In the camera model, the inaccuracy is mostly due to the discretization of the image plane. As the 2 rays become more nearly parallel to one another, a small amount of error will cause a large error in the estimation of the intersection of the rays. The best possible approximation which can be given will be when the rays are perpendicular to one another. Therefore, a rotation angle of 90 degrees is chosen to minimize this inaccuracy.

It should be noted that this stereo triangulation algorithm may be used in any situation where two images of the same object are available. In particular, the robot mounted camera model which acquires a second image from rotation of the object, may be used in any problem where the object is held by the robot. However, for each particular problem and associated objects, it must be decided what data is relevant, for example a centroid or the ends of lead. Vision algorithms must be written to extract this data. The basic issue or problem is that of distinguishing which points in one image correspond to the same points in the second image. This problem is known as the stereo correspondence problem and is discussed in a following section in this disclosure.

TRANSFORMING STEREO LOCATIONS TO TOOL TRANSFORMS

When describing an object which is being held in the gripper of a robot manipulator, it is often convenient to specify the motion of the object with respect to the robot base frame. In order to do this, a tool transformation must be defined which describes the position and orientation of the end of the tool with respect to the last frame of the robot. Since the movement of the robot is defined by its joint angles and forward kinematic joint solution, appending this tool transform to the end of the joint solution makes it possible to define the position and orientation of the end of the tool as the robot moves through space.

In the problem of inserting a lead into a hole, it is convenient to specify the lead end as a tool transformation. The lead positions yielded by the stereo algorithm are given with respect to the third link of the robot manipulator. First it is desired to determine which lead is the longest, for ease of insertion, since it has been assumed that one lead has been clipped shorter than another. This should be done with respect to the robot base frame, since this frame is stationary in space. In order to perform this, the leads are premultiplied by the transform $^OT_3$. The lead end z axis components must be compared to determine the least magnitude. This lead is labeled number 1 and will be inserted first, with the other lead being labeled number 2. Finally, in order to define the positions as tool transforms with respect to the last axis of the robot, the lead positions are premultiplied by $(^OT_6)^{-1}$.

CORRESPONDENCE PROBLEM

One of the major issues encountered when using stereo vision is the correspondence problem. That is, having one image consisting of several image points, find the corresponding image points of the object in the second image. In actuality, this can be a very difficult problem as the number of image points and the complexity of the scene grows.

The problem has been solved with the present invention for at least the case of two leaded nonstandard electronic components. One assumption which is made in this case is that both of the lead ends are visible in both images, and an algorithm has been devised that will determine both lead ends from an image. The problem is to distinguish which lead corresponds to which in each image. Another assumption which is made is that the axis of rotation is oriented vertically and lies somewhere between the two leads in both images. Since the leads are rotated about this axis, the other assumption is that the leads do not exchange positions with respect to the axis. That is, a lead which is on the left side of the axis will stay on the left side of the axis, and vice versa. This is not an unreasonable assumption since the component will be picked up in approximately the same manner each time. Also, axis 6, about which the component is rotated, projects through the center of the gripper, so this is assuming that the part is picked up approximately in the center of the gripper.

Therefore when the parts are rotated the leads will be shifted up and down and right to left, but they will not change respective right and left positions in the image. The correspondence criterion is to match leftmost and rightmost points in the images.

However, this is not a generalized method. Such a method may be desirable if the stereo algorithm is to be used with more than two points, such as in the problem of multiple leaded components.

In order to solve this problem a search technique must be used. The following procedure may be used to minimize the amount of searching which must be done. First a point is found on one image. The ray which this point makes through the first lens center is defined in space. The approximate distance of an object point is usually known, hence, a segment of this ray can be determined upon which the object point lies. Next this ray segment is mapped into the second camera. This may be done using the forward camera model. This defines a line segment on the second image plane where the image point should lie. This line is searched for the image point. If only one image point is found along this line, it is certain that this is the point in the second image which corresponds to the point in the first image. If this is the case, then the triangulation procedure can be used to find the three dimensional position of the image points. If, however, there is more than one image point which is found to lie upon the line segment, the triangulation procedure cannot be directly used. A possible solution to this problem might be to determine the object's position where possible. For the image points where there is confusion, a third image may be taken from another rotated position. The same correspondence criterion may be applied to the three images to find matches between remaining image points.

STEREO SOFTWARE

The stereo algorithm yields the tool transformations of the two lead ends of a two leaded nonstandard component. The inputs to the program consist of two images of the leads as well as the configuration of the robot and the angle through which the component is rotated to yield the second image. The routine calls a vision subroutine which finds the ends of the leads in each image as well as determining the lead correspondences between the first and second images.

Now the program reads the inverse camera transformation which was computed using the calibration routine and is stored on disk. Next the inverse camera transformation of the second image is computed using eq. 43. The location of each lead end with respect to robot frame 3 is found by the method previously described in Basic Stereo Arrangement using eqs. 34, 35 and 36.

These locations are premultiplied by $^OT_3$ to express them with respect to the robot base frame. The z components of the leads are compared to find the longest one and they are numbered accordingly to perform insertion. Finally the lead positions are premultiplied by $(^OT_6)^{-1}$ to represent them as tool transformations. A flowchart of the STEREO routine is shown in FIG. 10 as well as the program listing in the Appendix.

LEAD END RECOGNITION ALGORITHMS

INTRODUCTION

The following describes the method of obtaining the relevant vision data from the image of the component which data will then be used by the stereo algorithm. For the preferred embodiment, the relevant data consists of the center of the end of each lead. This is the minimum representation which may be used while still giving enough information to successfully insert the leads. Since no orientation calculation is done for the leads, it is assumed that the leads will be roughly pre-straightened. That is, the leads will be positioned approximately vertically without any severe bends. The lead ends will be expected to appear in a small portion of space. This space being the field of view of the camera. Therefore, it is the fine position of the lead ends which is desired.

Before describing the software itself, it is necessary to explain some of the peculiarities of the dynamic RAM camera and Apple IIe computer combination. Since the camera is of the RAM variety, the image is memory mapped directly into the high resolution graphics memory space of the Apple computer. The image information is stored with seven pixels of the image per byte of memory. This setup makes it possible to speed up the image processing time by almost a factor of seven. The reason being that in certain situations all the pixels within a byte may be processed together. This is possible when it has been found that all of the pixels lie in the background of an image, that is they are all zero, or when they are contained within an object of the image, they are all ones. For this reason a subroutine has been written which extracts a byte of image data at a time and determines whether the byte may be processed all at once. If the byte is not all ones or all zeroes, it means that there is a boundary of an object within the byte. In this situation, each pixel within the byte must be processed separately. A separate subroutine was written which analyzes each pixel of the byte by itself.

SOFTWARE

The first algorithm to be presented determines the location of two lead ends from a binary image. The remaining algorithms are rather generalized. The next two subroutines are used to analyze data one byte at a time and one bit at a time, respectively. The final algorithm draws the outline or the boundary of an object in the image.

LEADFIND Subroutine

Figure 14A:
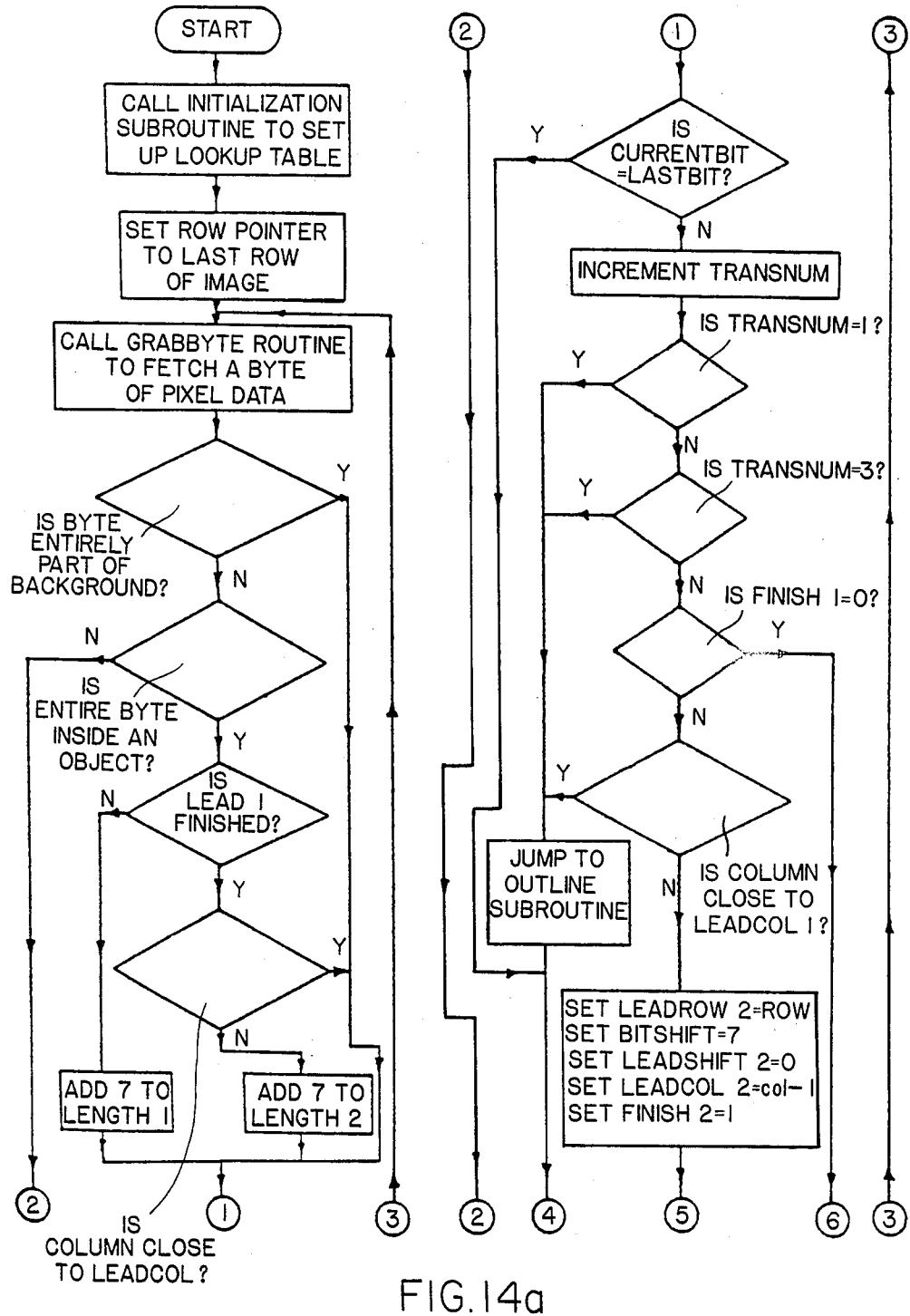
FIGS. 14a, 14b and 14c are flow charts of the program LEADFIND.
Figure 14B:
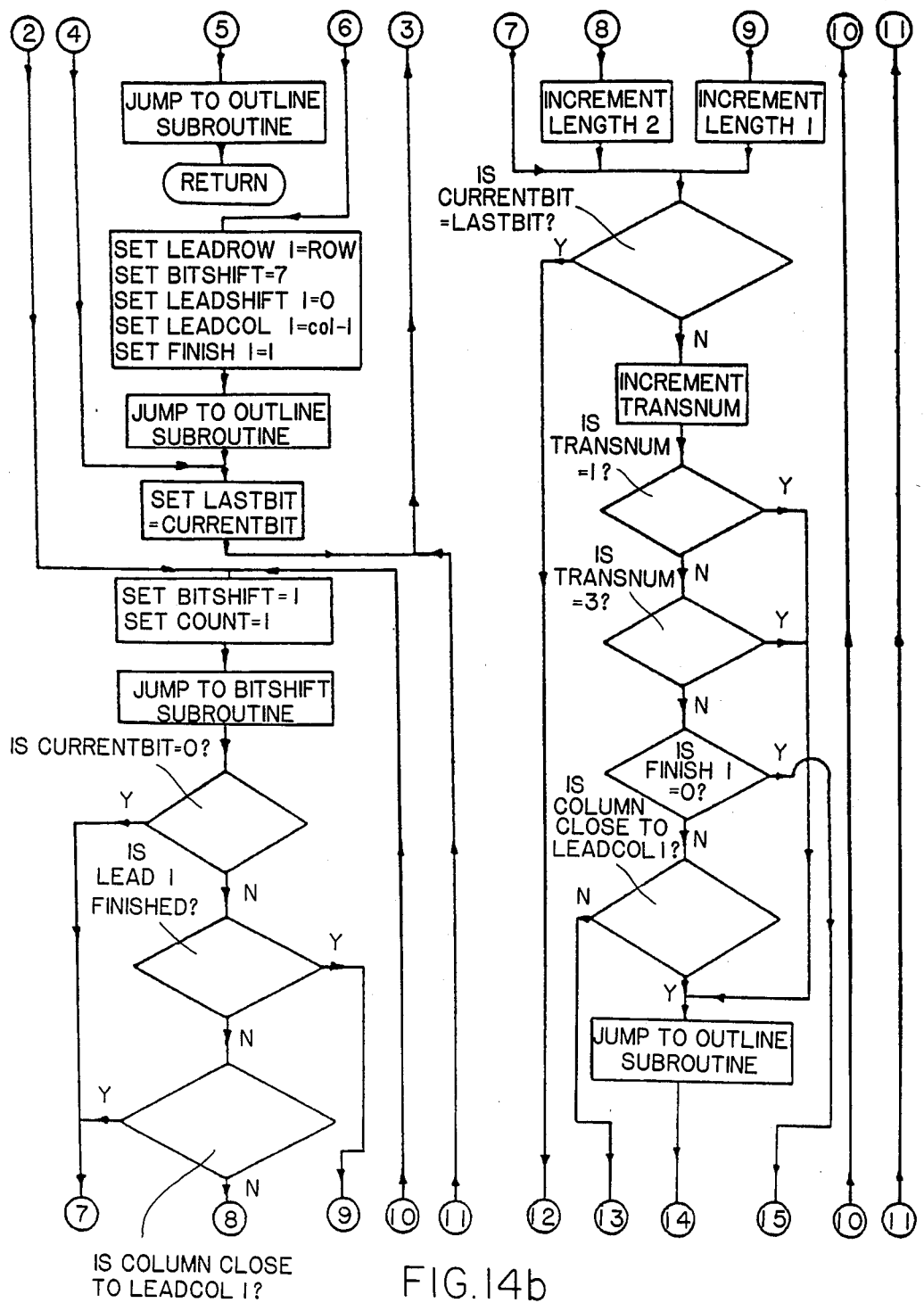
Figure 14C:
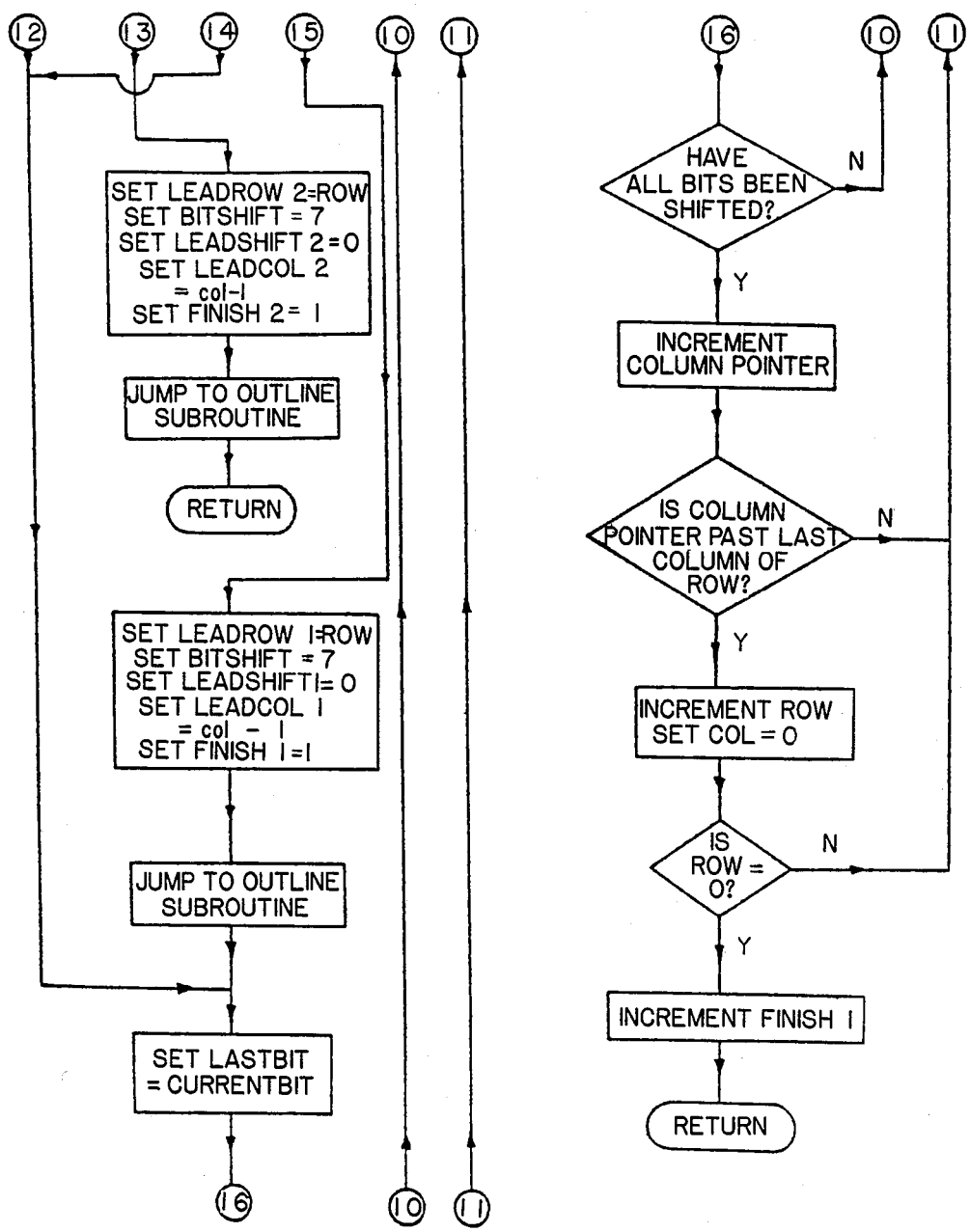

The binary image from the camera appears in the upper left hand corner of the high resolution graphics screen FIG. 12. It should be noted that this figure as well as FIG. 13 were printed in inverse graphics mode, i.e, white pixels are printed as black and vice versa, to allow better viewing of the figures. The leads enter the image at the top. The lead ends are visible above the bottom of the image. The LEADFIND routine, see FIG. 14, scans the image from left to right and from bottom to top. Each byte of image data is examined to determine if it is all background of the image so the next byte of the image is examined. The first image byte which is not all zeroes signals that a portion of the first lead end has been found. A complete lead end is identified by a low to high (0 to 1) transition followed by a high to low transition (1 to 0) in the binary image. This first non-zero byte is a high to low transition. The subroutine continues scanning the image until a high to low transition is generated. When this happens, the first complete lead end has been found, to show this a flag is set. The current row and column locations as well as the length of the lead is stored in memory.

Now, the end of the second lead must be determined. If the two lead ends appear in the same row, the second lead end will be yielded by searching the remaining bytes in the row. The algorithm is assured that this is the second lead end since a flag has been set to show that the first lead has been found.

However, it is highly unlikely that the two lead ends will lie in the same row. The first end will be assigned to the lead which protrudes lower in the image. The second lead will lie in a row which is above the first. Therefore, when scanning the image, the upper portion of the first lead will be recognized as well as the end of the second lead end. This first upper portion must be distinguished from the second lead end. This was done by comparing the column location of each lead segment which is found to the column location of the first lead end. If the segment is a sufficient distance, chosen arbitrarily as 14 pixels, away from the first lead end the segment is defined to be the second lead end. If this is not true, then the segment is assumed to be an upper segment of the first lead.

The assumption of the second lead end being at least 14 pixels away from the first allows for leads which are not perfectly vertical. However, it does not allow for leads which cross in the image. This was determined to be reasonable criterion since it is assumed that the leads have been roughly prestraightened.

When the second lead end is found, the column, row and length of it are saved by the program. This routine also calls the OUTLINE subroutine which draws the boundary of each lead as it is operated on. This second image is placed to the right of the image from the camera. When the LEADFIND routine is called by the STEREO program, crosses are placed in the image to show the location of each lead end as they are found (FIG. 5-2). A flowchart of this algorithnm is shown in FIG. 5-3 and the computer listing is given in the Appendix.

GRABBYTE Subroutine

This algorithm takes an enire byte of image data from the high resolution graphics screen and stores it in an intermediate memory location. The column and row location of the byte is supplied by the calling routine. The routine checks if the byte contains all zeroes. If it does, the background flag is set. If it is not, the byte is tested to see if it is all ones. If so, the inside flag is set to show that the byte is inside an object. If both of these conditions are not true, then there is a transition or boundary within the image byte. For this reason the byte may not be processed all together, but must be broken into individual bits. A flowchart of this routine and the computer listing may be found in FIG. 15 and the Appendix, respectively.

GETBIT Subroutine

Figure 15:
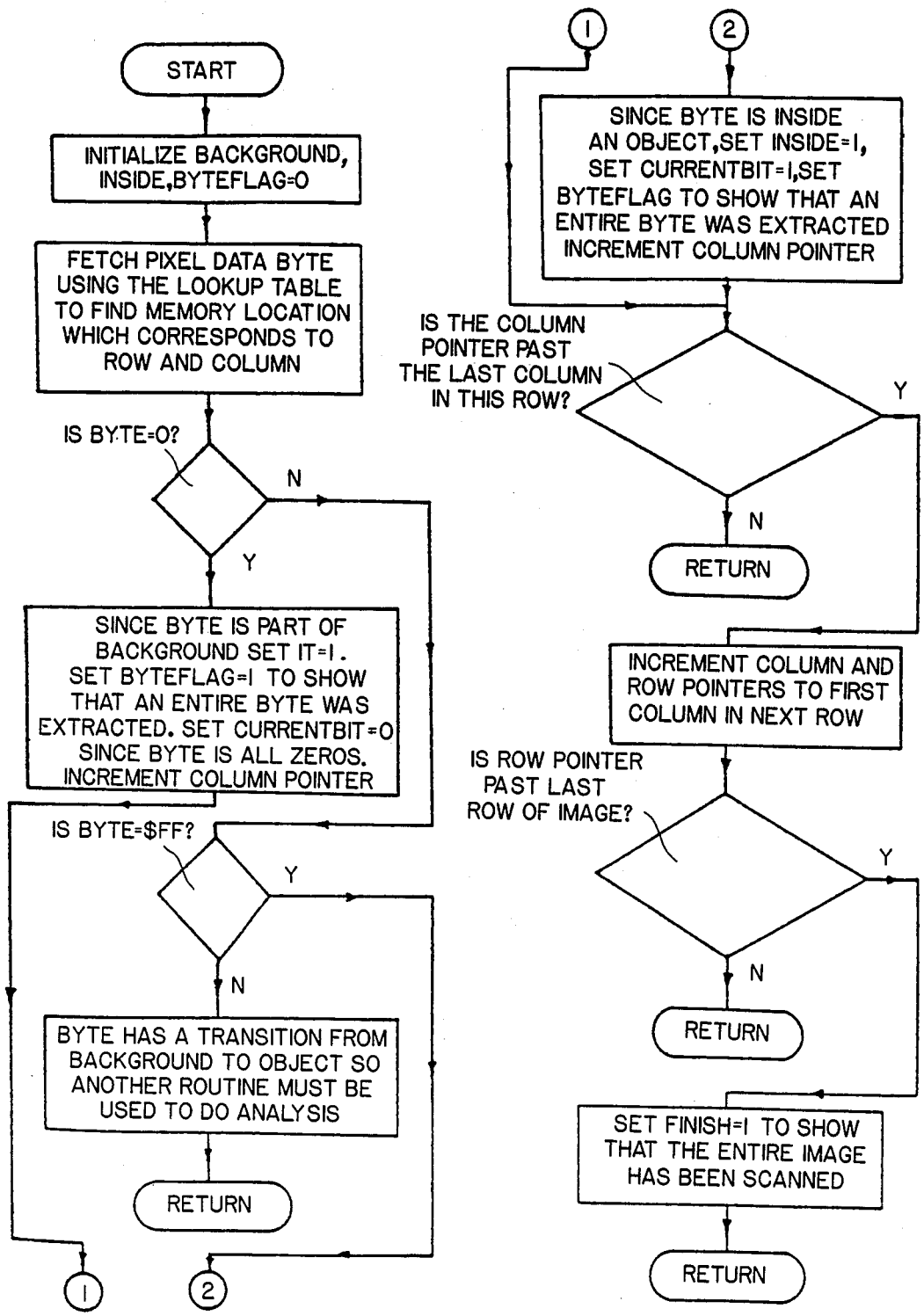
FIG. 15 is a flow chart of the program GRABBYTE.
Figure 16:
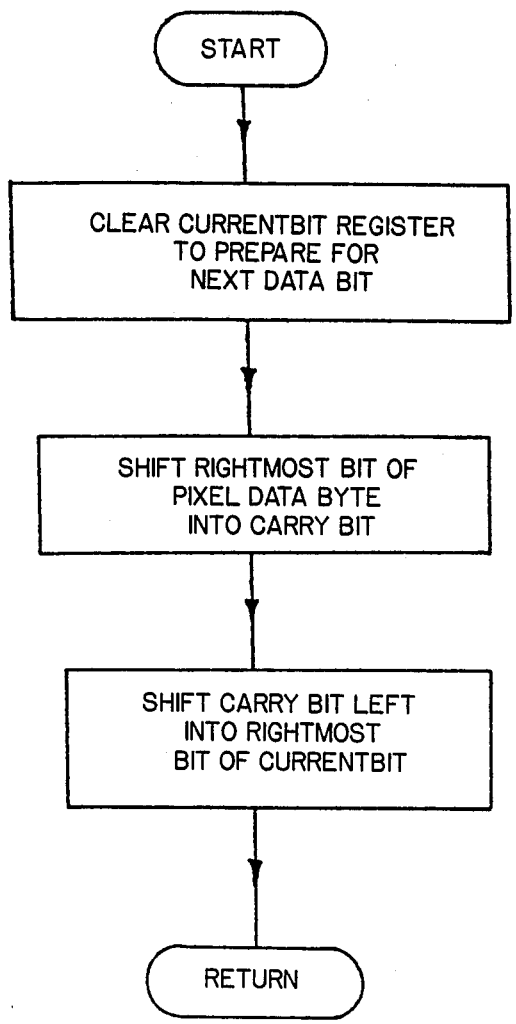
FIG. 16 is a flow chart of the program GETBIT.

This routine, see FIG. 15, must be used when a boundary is found within an image byte. The routine takes the next bit from the image byte which was extracted using the GRABBYTE routine. This is performed by rotating all the bits in the image byte to the right by one. The bit which is of interest is shifted out of the byte and into another memory location. This routine must be called seven consecutive times to examine all seven bits within an image byte. Refer to FIG. 16 for a flowchart of the GETBIT routine. The computer listing is set forth in the Appendix.

OUTLINE Subroutine

Figure 17A:
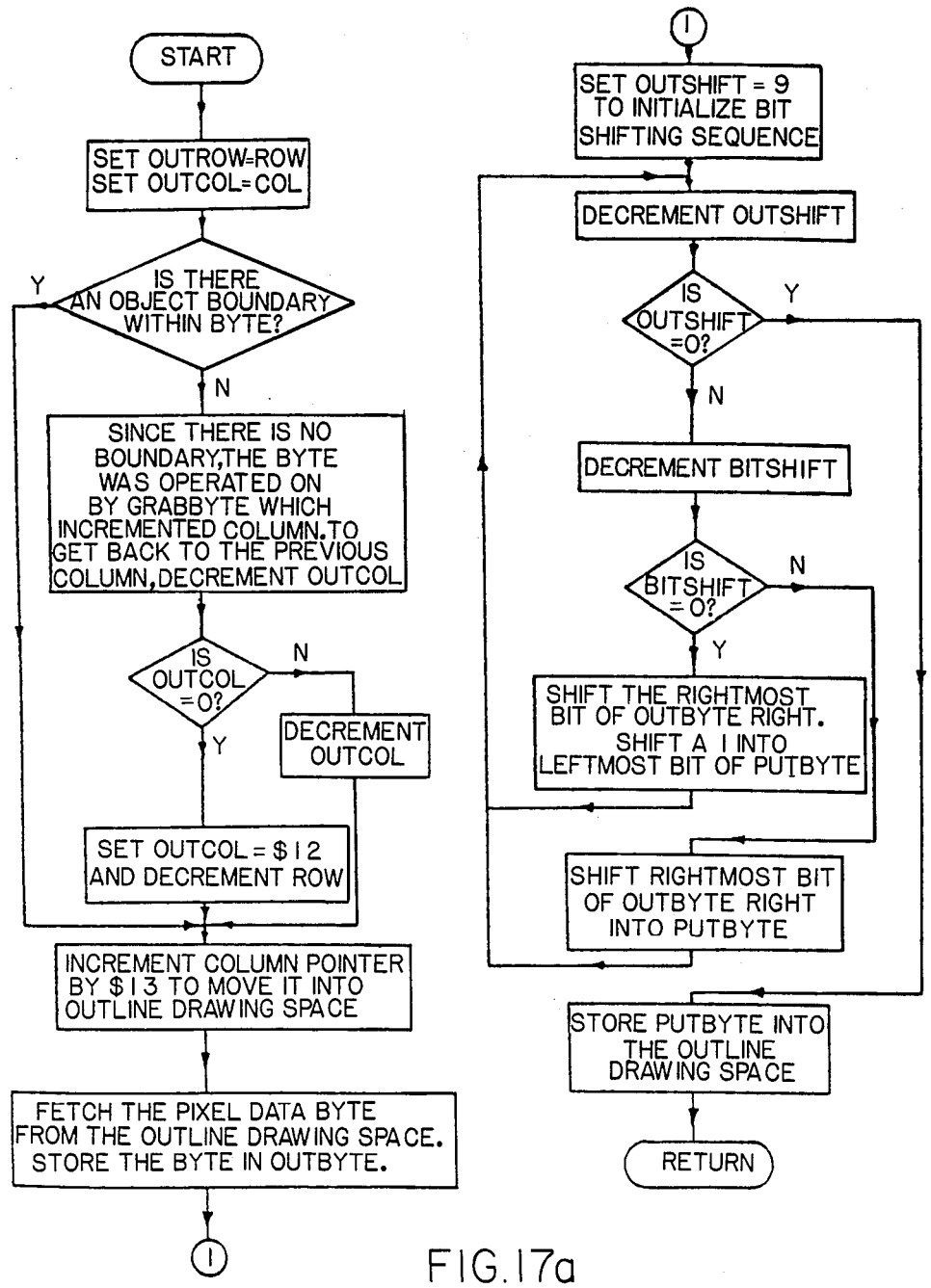
FIGS. 17a and 17b are flow charts of the program OUTLINE.
Figure 17B:
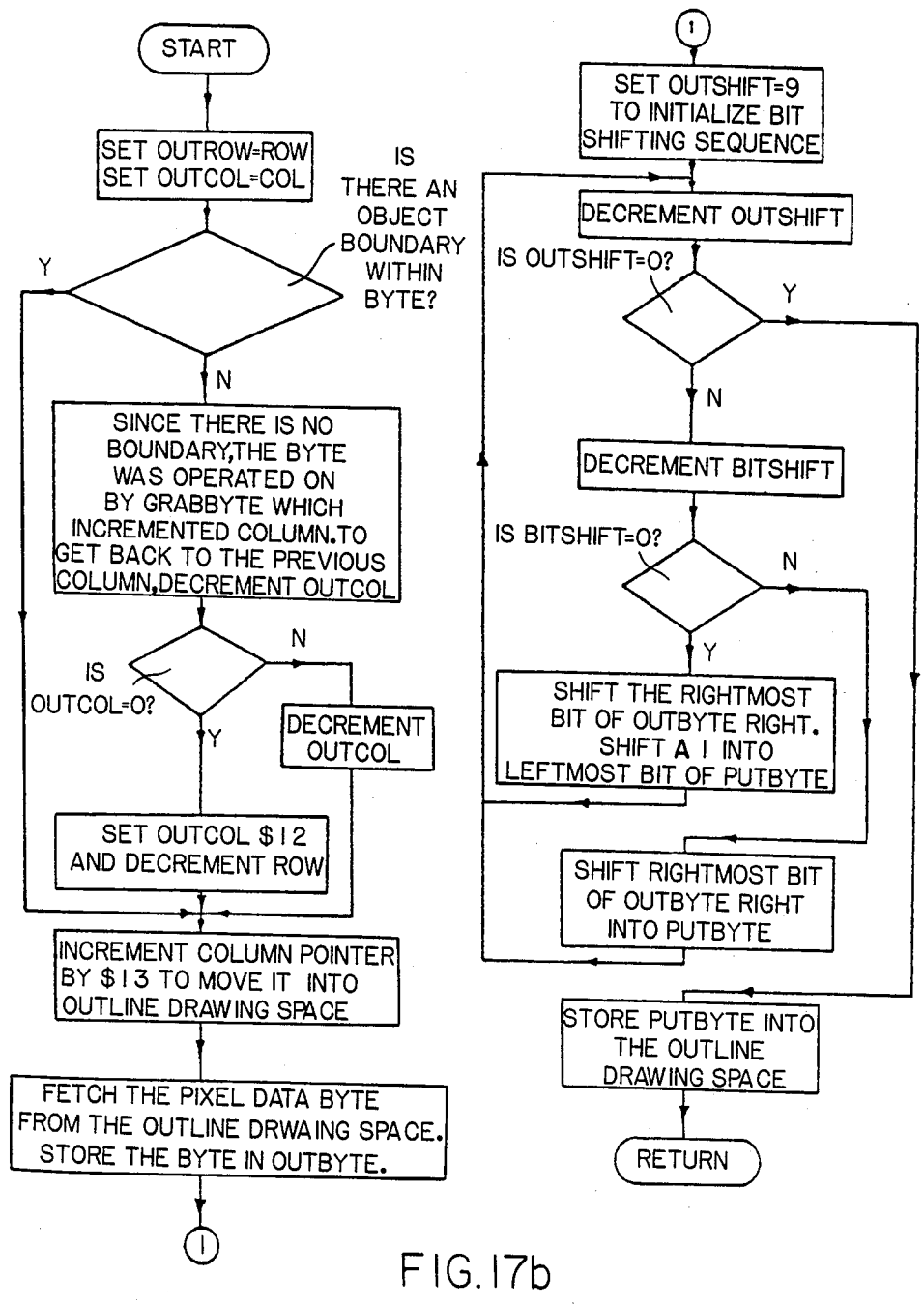

This subroutine, see FIG. 17, draws the outline of an object in an image on the high resolution graphics screen. The outline is drawn at the transition of boundary between an object and the background. This outline drawing is placed to the right of the actual image as shown in FIG. 13. This drawing is useful to show an observer what a vision algorithm is doing.

In order to draw the outline of an object, the routine must find the transition within the image byte. A transition might also occur between two alternately black and white bytes. This may be determined by examining whether the byte was analyzed all at once or not. When the location of the transition has been found, the corresponding bit in the outline drawing is turned on. This routine is called after every transition in the image is found. The flowchart for this routine is drawn in FIG. 17 and the program listing may be found in the Appendix.

EXPERIMENTAL CONFIGURATION AND RESULTS

Experimental Configuration

The experimental setup showing the robot, the miniature camera, and an electronic component is illustrated in FIG. 1. The camera 20 is mounted on the third link of the robot manipulator. It is assumed that the electronic component 18 has been picked up by the gripper from a feeding station where the components will be oriented in approximately the same manner each time.

The Apple IIe microcomputer serves as the vision analysis computer. The PUMA robot is controlled by its own processor running the VAL operating system.

Experimental Procedure

The first step in this procedure is to calibrate the camera. This is done by gathering the world coordinates of object points and the corresponding image points using the camera. The easiest method of doing this is to place an object in the gripper of the robot. The tool transformation of the object is measured with the manipulator, more specifically the coordinate transformation from the manipulator to the end effector. Now the object is moved through space in the field of view of the camera. A number of points are gathered by rotating the part about the last axis of the robot in the region where it is expected that the actual leads will appear. The LEADFIND subroutine is run which tells the location of the lead ends on the image plane. These data points are entered into the CALIBRATION program from the keyboard. At several points, the object is stopped. The robot is polled for the position of the object with respect to it's base. At the same time, an image is taken of the object and the location of the object on the image plane is yielded. Both of these correspondences are entered into the CALIBRATION program.

The FORWARD program can now be run to check the accuracy of the calibration model. An image is taken of an object point in space. The coordinates of the point in space are entered into the FORWARD program. It will yield the image coordinates for the camera model. The discrepancy between the model and the actual camera should be small, less than one pixel for a good camera model.

In theory since the camera calibration is based on a least squares parameter fitting, a better camera model should be obtained as more points are used to do the calibration. In actuality, the number of points which can be used is limited by both the amount of memory available in the computer as well as the amount of time taken to run the program. The memory limitation in this preferred embodiment allowed the use of up to 33 points. However, the time limitation was much more severe. It takes approximately 10 minutes of computation time when 25 points are used. This did not render the method unusable though, since the camera calibration must only be done when the camera is moved. The model will hold regardless of the configuration of the robot. It will even be valid if the manipulator is turned off and restarted as long as the robot is initialized and calibrated properly.

When a suitable calibration model has been developed, the STEREO program may be run to determine the lead ends of a two leaded component. Since the leads are very reflective, a lamp is used to reflect light off them so that they may be seen by the camera. In order to do the stereoscopic analysis, the component is picked up such that the end of the leads are visible in the image. The first image of the component is taken. The STEREO program prompts the user to rotate the component about axis 6 of the robot by the rotation angle entered. A second image is taken and the stereo analysis is performed yielding the tool transform of the lead ends. This analysis takes several seconds per component. In order to test the accuracy of the STEREO procedure, the tool transforms of the lead ends were also measured with the robot manipulator.

Experimental Results

The data given in table I was gathered using the methods outlined in the preceding section. The table consists of the x, y, and z coordinates of the tool transform of each lead end measured by the PUMA robot. The table also contains the x, y and z coordinates of the same tool transform given by the STEREO program. The column headed 'discrepancy', is the vector difference, between the tool transforms given by the STEREO program and the robot manipulator. The data in the table was obtained using 24 component lead correspondences for the calibration program. The rotation angle used in the STEREO routine was 90 degrees.

It was also noted that similar results to those given in the table were received when the manipulator configuration was changed as well as when the manipulator power was turned off and the manipulator was reinitialized.

The differences in tool transforms are observed to be more than twice that expected when solely considering the effective resolution of 0.74 mm×0.33 mm given in the discussion on the camera model. The main cause of this difference is that the ends as well as the centers of the leads which are observed on the image are not always the actual center and end of the leads. The lead ends are often not visible since a slight bend in the lead will fail to reflect light into the camera. Therefore, the end of the lead which is visible in the image may possibly be somewhat above the end of the lead by several pixels. Similarly since the light source is not projected from the same position as the camera, the light which is reflected off the round lead may not give an accurate depiction of the actual center of the lead.

A simple test was done to illustrate the magnitude of error in the tool transform which the STEREO program gives when an inaccuracy of one or more pixels occurs in the image. In this test, a point in space was chosen. This point was entered as input to the FORWARD program. The FORWARD program yields the image points on cameras 1 and 2 which correspond to the point in space. These points may now be entered into the STEREO program via the keyboard. If the exact pixel locations given by forward solution are entered, the routine gives exactly the point in space. However, it was found that shifts of one, three, and five pixels in one of the image coordinates produced errors of 0.4, 1.1, and 1.6 mm, respectively. This should help to clarify the need to identify the actual lead ends and centers accurately, and explain the inaccuracies shown in table 6-1.

TABLE I

Table of Experimental Results

| | Measured with robot (mm) | | | Measured with Stereo (mm) | | | discrepancy (mm) |
|---|---|---|---|---|---|---|---|
| | x | y | z | x | y | z | |
| 1 | 15.47 | −1.66 | 184.91 | 15.31 | 1.74 | 185.49 | .61 |
| 2 | −8.41 | −3.00 | 187.75 | −8.72 | −2.62 | 188.28 | .72 |
| 3 | 12.69 | −3.75 | 184.91 | 12.53 | −3.57 | 184.97 | .24 |
| 4 | −7.06 | .75 | 187.06 | −4.61 | .71 | 186.19 | 2.59 |
| 5 | 13.19 | 3.19 | 185.03 | 14.59 | 3.06 | 186.17 | 1.81 |
| 6 | −12.00 | 1.41 | 188.06 | −11.57 | .74 | 188.05 | .79 |
| 7 | 12.13 | 4.50 | 184.75 | 13.22 | 3.74 | 185.93 | 1.77 |
| 8 | −15.63 | 3.94 | 188.47 | −14.00 | 3.52 | 187.68 | 1.85 |
| 9 | 12.38 | .16 | 185.69 | 13.26 | −.59 | 185.57 | 1.16 |
| 10 | −14.34 | −.22 | 187.28 | −12.63 | .28 | 187.44 | 1.79 |
| 11 | 9.03 | 1.91 | 186.28 | 9.89 | .99 | 186.74 | 1.34 |
| 12 | −18.81 | −.63 | 187.09 | −19.17 | 1.23 | 188.54 | 2.38 |
| 13 | 10.28 | 2.72 | 186.28 | 10.93 | 1.54 | 186.45 | 1.35 |
| 14 | −17.00 | −1.13 | 187.00 | −17.44 | −.06 | 188.67 | 2.03 |
| 15 | 9.28 | .75 | 185.97 | 10.41 | −.03 | 186.83 | 1.62 |
| 16 | −19.44 | −1.88 | 186.81 | −21.74 | −.68 | 189.68 | 3.87 |
| 17 | 6.72 | .19 | 185.44 | 7.61 | −.69 | 186.25 | 1.49 |
| 18 | −15.78 | .53 | 185.59 | −13.62 | 1.97 | 187.34 | 2.64 |
| 19 | 9.66 | 1.69 | 185.78 | 10.63 | .53 | 185.98 | 1.52 |
| 20 | −14.00 | .97 | 185.94 | −11.05 | 1.97 | 186.54 | 3.17 |

Figure 18:
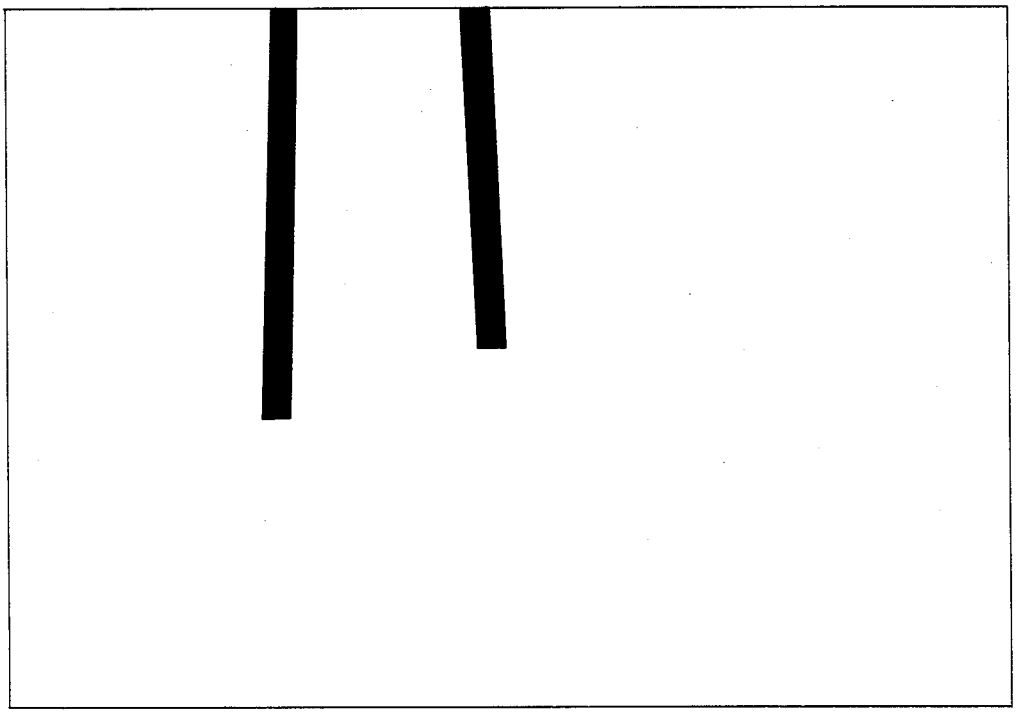
FIG. 18 is an image of two lead components as viewed by the camera.

The discrepancy of the center of the leads may be remedied by placing the light source as close to the camera projecting ray as possible. Ideally the camera and the light source would be built into the same housing so that the two may move as one unit. However, this solution offers no improvement to the lead end reflection problem. A better solution may be to backlight the leads, therefore yielding the entire object in the image rather than solely the reflected portion. A sample image using this technique is given in FIG. 18. It should be noted that the image algorithms must be changed to recognize a dark object and light background instead of vice versa. This solution might also allow insertion of square and other shaped leads which could not be possible using the reflected light technique.

The calibration and stereoscopic triangulation software combined with the described hardware configuration gave results which are consistent with the expected accuracy when the problem of lead illumination was considered. The method is valid for a wide class of two leaded electronic components with different distances between leads. The procedure is also adaptable to other robot manipulators requiring only a change in the robot dependent forward kinematic joint solutions which are used in the software. The dynamic RAM camera also performed well and was proven suitable for this application.

Having described our invention what we now claim is:

1. A method of determining the location of an object in space said object having at least two identifiable features which includes:
   (a) holding the object in a first position;
   (b) recording a first image of the object by a vision system;
   (c) rotating the object by a predetermined angle about a known axis;
   (d) recording a second image of the object by the vision system, the vision system remaining fixed with reference to the rotation of the object from its first to its second position;

(e) determining which feature in the first image corresponds to the same feature in the second image in the image plane;

(f) calculating a vector, $V_p$, which describes the location of a point in the image plane corresponding to the feature with respect to a known frame of a robot; which robot has a coordinate system; and (g) expressing said location as a tool transform.

2. The method of claim 1 which includes:
determining the location of said feature with respect to the robot coordinate system after calculating the vector $V_p$.

3. The method of claim 1 which includes:
moving the object from an acquisition site to a target site while steps (a)-(g) are executed.

4. The method of claim 1 which includes:
recording the images using binary processing after recording said first and second images.

5. The method of claim 1 which includes:
establishing an inverse camera transform for a first camera;
reading the inverse camera transform from a memory; and
calculating the center of the vision system in reference to its recording the first image subsequent to calculating the vector $V_p$.

6. The method of claim 5 which includes:
calculating the forward transform of a second camera by manipulation of the appropriate transformation multiplier;
calculating subsequently the center of the vision system in reference to its recording the second image; and
determining the baseline vector V.

7. The method of claim 6 which includes:
determining the length of a ray, a, to an object point from a first image plane;
determining the length of a ray, b, to the object point from a second image plane; and
determining subsequently $V_o$ the object point in space.

8. The method of claim 1 wherein the calculation of the vector V is effected with respect to a third frame of the robot.

9. A robot, having a robot coordinate system, for determining the location of an object in space, said object having at least two identifiable features which comprises:
means to hold the object in a first position;
means to record a first image of the object by a vision system;
means to rotate the object by a predetermined angle about a known axis;
means to record a second image of the object by the vision system, the vision system being fixed with reference to the rotation of the object from its first to its second position;
means to determine which feature in the first image corresponds to the same feature in the secon dimage in the image plane;
means to calculate a vector $V_p$ which describes the location of the point in the image plane corresponding to the feature; and
means to express the feature as a tool transform.

10. The system of claim 9 which comprises:
means to determine the location of the feature with reference to the robot coordinate system.

11. The system of claim 9 which comprises:
means to move the object from an acquisition site to a target site while the object is held and rotated.

12. The system of claim 9 wherein the vision system comprises:
a housing;
a lens secured to the housing;
a sensor secured to the housing in optical communication with the lens, the element adapted to produce a binary image.

* * * * *